(12) United States Patent
McGarrahan et al.

(10) Patent No.: US 11,831,346 B2
(45) Date of Patent: Nov. 28, 2023

(54) ADAPTABLE, RECONFIGURABLE MOBILE VERY SMALL APERTURE (VSAT) SATELLITE COMMUNICATION TERMINAL USING AN ELECTRONICALLY SCANNED ARRAY (ESA)

(71) Applicant: PathFinder Digital, LLC, Sanford, FL (US)

(72) Inventors: Roger K. McGarrahan, Orlando, FL (US); Justin R. Bertelsen, Deland, FL (US)

(73) Assignee: PathFinder Digital, LLC, Sanford, FL (US)

( * ) Notice: Subject to any disclaimer, the term of this patent is extended or adjusted under 35 U.S.C. 154(b) by 66 days.

(21) Appl. No.: 17/707,678

(22) Filed: Mar. 29, 2022

(65) Prior Publication Data
US 2022/0311506 A1 Sep. 29, 2022

Related U.S. Application Data

(60) Provisional application No. 63/167,643, filed on Mar. 29, 2021.

(51) Int. Cl.
*H04B 7/185* (2006.01)
*H04B 7/195* (2006.01)
*H04B 7/19* (2006.01)

(52) U.S. Cl.
CPC ..... *H04B 7/18513* (2013.01); *H04B 7/18528* (2013.01); *H04B 7/19* (2013.01); *H04B 7/195* (2013.01)

(58) Field of Classification Search
None
See application file for complete search history.

(56) References Cited

U.S. PATENT DOCUMENTS

| 5,652,597 A | 7/1997 | Caille |
| 5,945,946 A | 8/1999 | Munger |

(Continued)

FOREIGN PATENT DOCUMENTS

| EP | 0638956 A1 | 8/1994 |
| EP | 2260539 B1 | 5/2018 |

(Continued)

OTHER PUBLICATIONS

PCT/US2022/022389; International Search Report; dated Dec. 29, 2022.
PCT/US2022/022389; Written Opinion of the International Searching Authority; dated Dec. 29, 2022.
Karmaker, Nemai, C., Bialkowski, Marek, E., "Electronically Steerable Array Antennas for Mobile Satellite Communications" Cardinal Intellectual Property, IEEE Xplore, 2016.

(Continued)

*Primary Examiner* — Shripal K Khajuria
(74) *Attorney, Agent, or Firm* — Lowndes; Stephen Thomas

(57) ABSTRACT

Combinations of antenna types, which may include parabolic reflectors, electronically scanned arrays (ESAs), lens antennas and other directional antenna types enable a satellite ground terminal that is adaptable for use in multiple frequency bands such as C, Q, V, Ku, X and Ka bands, with satellites in various orbital configuration such as LEO, MEO, other non-GEO, and GEO, and in various user scenarios such as fixed, At the Quick Halt (ATQH), or On-the-Move (OTM). The VSAT or MVSAT of the invention does not require alteration or modification to support these multiple uses cases. As a result of this interoperability there are savings in unit cost and logistics. The system and method of the invention allow rapid reconfiguration of the ground segment of a satellite communication system to overcome loss of space segment assets, by enabling the inventive ground terminal to quickly transition to communicate with alternative satellites.

37 Claims, 17 Drawing Sheets

(56) References Cited

U.S. PATENT DOCUMENTS

| | | | |
|---|---|---|---|
| 6,198,452 B1* | 3/2001 | Beheler | H01Q 3/08 |
| | | | 343/765 |
| 6,218,999 B1 | 4/2001 | Bousquet et al. | |
| 6,456,252 B1 | 9/2002 | Goyette | |
| 6,965,355 B1 | 11/2005 | Durham et al. | |
| 6,999,044 B2 | 2/2006 | Durham et al. | |
| 7,656,358 B2 | 2/2010 | Haziza | |
| 7,911,400 B2 | 3/2011 | Kaplan et al. | |
| 7,990,316 B2 | 8/2011 | Cock et al. | |
| 8,134,511 B2 | 3/2012 | Koh et al. | |
| 8,334,809 B2 | 12/2012 | Nichols et al. | |
| 8,872,719 B2 | 10/2014 | Warnick | |
| 9,153,877 B2 | 10/2015 | Burr | |
| 9,647,748 B1* | 5/2017 | Mitchell | H04B 7/18508 |
| 10,263,342 B2 | 4/2019 | Hand et al. | |
| 10,608,760 B2 | 3/2020 | Cordone | |
| 10,674,417 B2 | 6/2020 | Choquette | |
| 2003/0231238 A1 | 12/2003 | Chew et al. | |
| 2006/0114164 A1 | 6/2006 | Iluz et al. | |
| 2009/0295654 A1* | 12/2009 | Baker | H01Q 3/08 |
| | | | 343/882 |
| 2015/0123843 A1 | 5/2015 | Lier et al. | |
| 2019/0027835 A1 | 1/2019 | Hoyt | |
| 2020/0245210 A1 | 7/2020 | Fotheringham et al. | |

FOREIGN PATENT DOCUMENTS

| | | |
|---|---|---|
| WO | WO2020223387 A1 | 5/2020 |
| WO | WO2020167897 A1 | 8/2020 |

OTHER PUBLICATIONS

Yang, Zhenchao, "High-Efficiency Passive and Active Phased Arrays and Array Feeds for Satellite Communications", (2015). All these and Dissertations. 5741. http://scholarsarchive.byu.edu/etd/5741.

Scardino, Paul., "Innovation: New Antennas, New Opportunities—What's all the Hype about Electronically Steered/Scanned Antennas (ESAs)?" SatMagazine, http://www.satmagazine.com/story.php?number=1996817141, 2018.

Strout, Nathan., "Here is the Space Force's new Enterprise SATCOM Vision." C4ISRNET, Feb. 20, 2020.

Liquori, William, Jr., Raymond, John W., United States Space Force Vision for Satellite Communications (SATCOM), Jan. 23, 2020.

Mehney, Paul., et al., "Delivering the Unified Network", U.S. Army Technical Exchange Meeting, Dec. 2, 2021.

Waterman, Shaun., "Flat Panel to the Rescue: Antenna Manufacturers Invest in Emerging Technologies to Meet New Demands" Access Intelligence, Mar. 29, 2022.

* cited by examiner

ADAPTABLE, RECONFIGURABLE MOBILE VERY SMALL APERTURE (VSAT) SATELLITE COMMUNICATION TERMINAL USING AN ELECTRONICALLY SCANNED ARRAY (ESA)

CROSS REFERENCE TO RELATED APPLICATIONS AND INCORPORATION BY REFERENCE

This application is a non-provisional of, and claims benefit of priority to, U.S. provisional patent application Ser. No. 63/167,643, entitled ADAPTABLE, RECONFIGURABLE MOBILE VERY SMALL APERTURE (VSAT) SATELLITE COMMUNICATION TERMINAL USING AN ELECTRONICALLY SCANNED ARRAY (ESA), filed in the United States Patent and Trademark Office (USPTO) on Mar. 29, 2021, the entire disclosure of which is incorporated herein by reference.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The field of the invention relates generally to systems and methods for satellite communication; more specifically the field of the invention relates to antenna systems for satellite communication link earth terminals, which may be any stationary or mobile ground, shipboard, airborne or other terminals used for Beyond Line Of Sight (BLOS) communication with satellites.

2. Background

For beyond line of sight (BLOS) communications, it may be desired to communicate information from a sending, or transmitting user to a receiving user, by way of a satellite or satellite network (collectively herein, a satellite). There are a number of link parameters that must be considered in order to determine whether a particular ground terminal will be able to reliably communicate with a particular satellite. Some of these link parameters are specific to the particular satellite or satellite network, and some of these link parameters are specific to the ground terminal (also referred to frequently as an earth station). Such satellite link parameters, which typically vary between satellites, may include, for example, frequency band of operation; antenna beamwidth and gain-to-noise temperature (G/T); orbital configuration of the satellite, for example, whether the satellite is in Geostationary Equatorial Orbit (GEO) in which the satellites may be located approximately 22,000 miles above earth sea level, Medium Earth Orbit (MEO) in which the satellites may be located as close to the Earth as approximately 1,200 miles above sea level, or Low Earth Orbit (LEO), in which the satellites may be located at less than 1,200 miles above sea level; receiver noise figures; satellite transponder Effective Isotropic Radiated Power (EIRP); and other satellite link parameters. Further, depending on their orbital configuration, various satellites may be moving at various speeds relative to a geographical point on the surface of the Earth at which a communicating ground station may be located, which may require that the ground station antenna be steered, either mechanically or electronically, or both, such that it's beam remains pointed at the satellite.

For a GEO satellite, for example, the communicating satellite may be stationary relative to a geographical point on the surface of the Earth, while a satellite in LEO may be moving very quickly relative to a geographical point on the surface of the Earth, meaning the ground terminal antenna beam must be steered in real time to stay pointed at the satellite, and if the antenna is not physically steered but is electronically scanned, such as when using an ESA, the change in gain due to the scan angle relative to the broadside vector must be accounted for. Thus, the ground terminal, which may be characterized by its own set of link parameters including antenna beamwidth and gain, receiver noise figure, and other parameters, may also be characterized by a pointing error as it attempts to remain in communication with the satellite, which may be moving across the usable pointing range or scanning range of the ground terminal antenna.

Because these link parameters represent a number of simultaneous physical states that must be properly accounted for in order to communicate reliably with a particular satellite or satellite network, satellite ground terminals have historically been designed to operate in dedicated fashion on a specific communication satellite or satellite network, operating at a specific band, with satellites in a specific network orbital configuration, and in a specific use scenario (for example either fixed, At the Quick Halt (ATQH), or On-the-Move (OTM)). As a result, prior art satellite ground terminals cannot readily operate on alternate satellite networks with different architectural characteristics and/or different use scenarios due to the fact that the link parameters vary so widely between satellites, especially when located in differing orbital configurations, that the communication links will not close. And, thus, it usually takes modifications to satellite ground terminals so that they can communicate reliably on alternate satellite networks. These modifications take time to execute, require a high degree of technical skill, can lead to error, and may be expensive. The result is that users must elect between specific ground terminal designs, each tailored to communicate with a specific satellite or satellite network, constellation or orbital configuration. This leaves a user unable to quickly reconfigure their satellite ground terminal to communicate with alternative satellites in the event such change becomes necessary for some reason such as, in time of war, satellites rendered inoperable due to hostile action, or, generally, a change of satellite lease driven by economic reasons, on-orbit failures, satellite beam coverage availability in a geographic region, and the like.

The operability and continuity of communications through, for example, loss of satellites due to hostile activity, jamming, or on orbit failures, and the increasing threat of such loss, requires satellite communications terminals that are agile and able to quickly transition between satellites. With the deployment of commercial communications satellites in LEO, MEO, GEO and non-GEO orbits, an opportunity to address this increasing risk of loss of satellite functionality has been created, however, to take advantage of the increase number of available satellites, communications terminals are now needed that are able to communicate with satellites in different orbital configurations, in different constellations, and operating on differing RF frequency band. There is an emerging need to communicate with multiple, and diverse, satellites at the same time in order to achieve high availability rates and to provide "make before break" functionality in order to switch communication from one satellite to another when a satellite is lost on orbit.

Prior art parabolic reflector antennas may typically use a feed system, such as a horn configuration, in combination with a parabolic reflector. The feed may be characterized as having a radiation pattern that covers (i.e., illuminates) the parabolic reflector (or subreflector, in systems that utilize them). The parabolic shape of the reflector ensures that the paths of the radiation from the feed antenna to the reflector that are reflected outwards from the reflector are all the same length, so that they combine in phase to produce a radiating plane wave from the parabolic reflector. This produces a highly directional beam that can radiate a narrow beamwidth. Because the beamwidth may be narrow, the antenna does not receive out-of-beam unwanted radiation from, for example, off-beam noise or jamming sources. The combination of high directivity and high radiation efficiency results in a high gain for the parabolic reflector antenna. The antenna gain can be controlled by controlling the size of parabolic reflector relative to the wavelength of the received or transmitted electromagnetic (EM) energy. In non-moving use cases, the parabolic reflector antenna may be pointed at the communicating satellite, and, as long as the reflector is not physically disturbed by outside forces, it will remain pointed at, and in communication with, a satellite. But in mobile applications, such as on a vehicle, the reflector must be repositioned whenever the vehicle moves in order to keep it pointed at the satellite. This requires a motorized mount, such as is commonly known as positioner, which adds bulk and weight, often making the dish antenna slow and cumbersome, or simply impractical for use in mobile applications. The costs of manufacturing an accurate parabolic reflector and a stable, precise positioner can be high. Furthermore, because the positioner is a motorized gear-driven mechanical assembly, it is subject to mechanical failure from shock and vibration, wear and tear, corrosion and the like.

Electronically Scanned (or Steered) Arrays (ESAs) are flat panel antennas that electronically steer (scan) their beams to communicate with satellites. Most ESAs comprise a large number of individual antenna elements whose signals are combined in a phase controlled fashion to produce constructive and destructive interference, forming a beam that can be steered to track and communicate with a satellite much more quickly than mechanical systems such as a pedestal-mounted and steered parabolic reflector antenna. ESAs may have a low profile of only a few inches and a relatively low weight. They can be mounted on the roof or other external surface of a vehicle and thus are very useful for mobile applications. The accuracy and speed of electronic beam steering means that ESAs, in comparison with parabolic reflector antennas, can more easily stay in communication with a satellite while the vehicle is mobile. These advantages make them ideal for use on mobile platforms of almost any size, including buses, first responder vehicles, cars, construction vehicles, airplanes, and ships. However, ESA antennas have certain shortcomings such as lower gain than parabolic reflector antenna with a similar aperture, and the variation in gain as the location and orientation are changed. For example, at high latitudes under geostationary satellites, a horizontal ESA may have less aperture area facing the satellite than a steered parabolic reflector, or dish, resulting in lower efficiency than a dish, which can be mechanically pointed at the satellite for maximum gain.

Thus, both parabolic reflector antennas and ESA antennas have certain shortcomings when used standalone.

It has long been recognized in the art that an adaptable, reconfigurable, interoperable satellite ground terminal that would provide users the flexibility to communicate with any available satellite or satellite network regardless of the operating band, the orbital configuration, any of the various link parameters, or the use scenario (fixed, ATQH, or OTM) using a single ground terminal antenna system, without the need for significant hardware and software reconfiguration, would fill a great need.

BRIEF SUMMARY OF THE INVENTION

The present invention comprises an apparatus and method that have one or more of the following features and/or steps, which alone or in any combination may comprise patentable subject matter.

In embodiments the subject invention is an antenna system for a satellite communication terminal for communicating with one or more satellites, in which the antenna system comprises a combination of one or more shaped reflector(s) and an ESA, wherein the ESA may direct a beam at one of the reflectors, and, in embodiments, may also direct a beam directly at one or more satellites, for communicating directly with the one or more satellites.

In embodiments the subject invention is a satellite communications terminal for communicating with one or more satellites, in which the communications terminal comprises an antenna system that, in turn, comprises a combination of one or more shaped reflector(s), and an ESA, wherein the ESA may direct a beam at a reflectors, either a main reflector or a subreflector, and, in embodiments, may also direct a beam directly at one or more satellites, for communicating directly with the one or more satellites.

In embodiments, the satellite communications terminal may be, for example but not by way of limitation, a Very Small Aperture Terminal (VSAT) or Mobile VSAT (MVSAT), that, in embodiments, combines parabolic reflector and ESA antennas, using the advantages of both antenna types, to provide users a satellite communication ground (or other) terminal that communicates with satellites seamlessly across various network service providers, including those that operate in various frequency bands and orbital configurations, and in various use scenarios. In embodiments, the invention is combines the capabilities of directional antennas, such as, for example parabolic antennas, Electronically Scanned Array (ESA) antennas, lens antennas including but not limited to lens antennas comprising a shaped dielectric lens, and any other directional antenna into one satellite ground terminal so as to overcome the shortcomings of the prior art. In some embodiments, more than one beam may be directed at a satellite from the satellite communications terminal (or the satellite communications terminal antenna system) of the invention, allowing simultaneous communication with more than one satellite. In embodiments, the satellite communications terminal and its antenna may simultaneously communicate with satellites in different frequency bands and in different orbital configurations, different satellite constellations, or different satellite networks, and is able to transition communication from satellite to satellite, without the need to change RF or other components such as, for example, RF feed components.

The subject invention comprises embodiments of a novel satellite communications terminal that can accommodate a variety of satellite network architectures and use scenarios in a single, configurable design, without the need for significant, time-consuming and expensive hardware swap out and/or system reconfiguration or alteration.

The inventive satellite communications terminal, and the inventive satellite communications terminal antenna system, can operate on disaggregated satcom network platforms (government, commercial, international), multiple bands (for example C, V, Q, Ka, Ku, and X band), various baseband hardware and waveforms (commercial and government modems and waveforms, Flexible Modem Interface, and software defined radio), various orbital architectures and configurations (GEO, MEO, LEO and non-GEO), and various user operational deployment scenarios (At the Quick Halt, On-The-Move).

The satellite communications terminal, and the inventive satellite communications terminal antenna system of the invention, in embodiments, may comprise an antenna system, comprising a main reflector and an electronically scanned array having a radiating surface radiating at least one beam for radiating at least one RF signal; wherein the electronically scanned array is attached to a rotatable, extendable and contractable feed arm, and wherein said rotatable, extendable and contractable feed arm is rotatably attached to a reflector support structure, the support structure supporting the main reflector; wherein the rotatable, extendable and contractable feed arm is operable to locate the electronically scanned array radiating surface at a focal point of said main reflector when the rotatable, extendable structure is extended into a first position; and wherein, in the first position, the electronically scanned array is oriented such that a first electronically scanned array beam is directed towards the main reflector, and wherein said first electronically scanned array beam is reflected by the main reflector, creating a first radiating beam for communicating with a first earth-orbiting satellite; and wherein the rotatable, extendable and contractable feed arm is operable to locate the electronically scanned array radiating surface near a portion of the main reflector surface when the rotatable, extendable feed arm is contracted and rotated into a second position; and wherein, in the second position, the electronically scanned array is oriented such that one or more electronically scanned array RF beams creates one or more radiating beams for communicating directly with one more second earth-orbiting satellites. There may be more than one electronically scanned array RF beams for communicating with more than second one earth-orbiting satellite. In embodiments, the first and second earth-orbiting satellites may be the same satellite.

The electronically scanned array at least one beam may further be defined as being two or more beams, each of the two or more beams able to be independently directed towards different earth-orbiting satellites when the satellite communications terminal antenna is configured in the second position as depicted in FIG. 2A. When the satellite communications terminal antenna is in the second position, the satellite communications terminal antenna is configured as a DRA (defined below). The earth-orbiting satellites may be in the same or different orbital configurations. The radiating surface of the electronically scanned array may be extendable by the addition of electronically scanned array extension panels.

In embodiments the main reflector may be supported by a tracking antenna pedestal, the tracking antenna pedestal operable to rotate the parabolic reflector in azimuth and elevation directions such that the main reflector is able to track and communicate with satellites in LEO and MEO, and to point to, and communicate with, satellites in GEO. However, these are but exemplary use cases of the invention. The satellite communications terminal and its antenna system may be used to communicate with any satellite or combination of satellites including but not limited to one or more satellites in LEO, MEO, GEO, non-GEO, and any other earth-orbiting orbital configuration.

In any of the embodiments, the reflective surface of the main reflector may be parabolic in shape.

In any of the embodiments satellite communications terminal, and the inventive satellite communications terminal antenna system, may be adapted to be mounted onto a vehicle, marine vessel, aircraft, or trailer, establishing a Mobile VSAT, or MVSAT.

In embodiments, the ESA first and second beams may comprise C, V, Q, X-band, Ku-band, Ka-band RF energy. However, these are but exemplary use cases of the satellite communications terminal, and the inventive satellite communications terminal antenna system of the invention, of the invention. In general, the inventive satellite communications terminal may communicate on any number of frequency bands for any of its beams, including but not limited to X, Ku, Ka, C, V, Q, and any other frequency band.

In embodiments, the tracking antenna pedestal may be a single, dual, or multi axis tracking pedestal.

In embodiments, the inventive satellite communications terminal antenna system may be configured as an off-axis or offset reflector system, which may be bottom-feed or top-feed configuration In embodiments, the inventive satellite communications terminal antenna system may comprise a main reflector, a subreflector or subreflectors and an ESA, wherein the ESA may be located along a surface of the main reflector and may be oriented so as to irradiate the subreflector, the subreflector being located and oriented so as to reflect energy from the ESA into the reflecting surface of the main reflector, and wherein the main reflector is located and oriented so as to reflect energy from the subreflector outward from the satellite communications terminal antenna system in an intended direction towards a receiving antenna on an earth-orbiting satellite.

In embodiments, the invention may comprise a subreflector, or secondary reflector or reflectors, having a reflecting surface that is convex or concave in shape.

In embodiments, the satellite communications terminal antenna may be configured as a Cassegrain, Gregorian or other system configuration.

In embodiments, the satellite communications terminal antenna system of the invention may comprise a Nasmyth Cassegrain configuration comprising a main reflector, a subreflector, a tertiary reflector and an ESA, wherein the ESA is located behind the main reflector and is oriented so as to irradiate the tertiary reflector, and wherein the tertiary reflector reflects energy from the ESA through an opening in the main reflector towards the subreflector, the subreflector being located and oriented so as to reflect energy from the tertiary reflector into the reflecting surface of the main reflector, and wherein the main reflector is located and oriented so as to reflect energy from the subreflector outward from the satellite communications terminal antenna in an intended direction towards a receiving antenna.

In embodiments, the satellite communications terminal antenna may comprise a subreflector that may be configured in a Cassegrain or Gregorian configuration, using the ESA as an antenna feed, for example as depicted in FIGS. 3A and 3B.

In embodiments, the satellite communications terminal antenna main reflector, optional subreflector and ESA feed may be configured as an offset or off-axis design, Cassegrain or Gregorian, for example as depicted in FIGS. 4A-4F.

In embodiments, the satellite communications terminal antenna may be configured as Nasmyth Cassegrain or Gregorian configurations, for example as depicted in FIGS. 5A and 5B.

The subject invention is more robust, resilient, flexible, and capable of operating through a contested, degraded, and operationally limited environment than systems of the prior art. It can accommodate a disaggregated network architecture for resilience and flexibility. The satellite communications terminal, and the inventive satellite communications terminal antenna system of the invention may comprise any of the following features, in any combination:
1. Singular, dual, or multi-axis tracking antenna pedestal or other pedestal designs, either custom, or Commercial Off The Shelf (COTS) for establishing and maintaining pointing at intended satellites;
2. Parabolic dish reflector, either custom, or COTS; and
3. Passive Electronically Scanned Array (PESA), Active Electronically Scanned Array (AESA), Hybrid Phased Array, Digital Beam Forming (DBF) Array, and/or Hybrid Beam Forming (HBF) Array, with analog, hybrid, and/or digital beamforming capabilities.

In embodiments, the invention may comprise a parabolic reflector integrated with any number and combination of Passive Electronically Scanned Array (PESA), Active Electronically Scanned Array (AESA), Hybrid Phased Array, Digital Beam Forming (DBF) Array, and/or Hybrid Beam Forming (HBF) Array, all of which fall within the meaning of "ESA". Depending upon network architecture and operational conditions, the subject terminal can operate in a variety of configurations. For example, in embodiments, 1) an ESA may operate as the antenna feed element, in coordination with the parabolic reflector creating a Phased Array Fed Reflector (PAFR); 2) an ESA may operate independently of the reflector as a Direct Radiating Phased Array (DRA) antenna; and 3) the ESA may operate concurrently with the reflector as a PARF and DRA antenna. Further embodiments of the invention may include an in-focus or de-focused feed design and/or one which accommodates mechanisms which allow for the alteration of the feed focus characteristics.

The parabolic reflector may be steered mechanically by way of a single, dual, or multi-axis pedestal, or manually; furthermore, the ESA may also be mechanically steered by the same and/or independent pedestal or may be pointed manually. Additionally, in embodiments, the ESA may be oriented such that it radiates one or more beams directly to one or more satellites to allow for DRA operations; or, in embodiments the ESA may remain fixed, depending upon configuration and operational needs.

Generally, the invention is a satellite communications terminal, or a satellite communications terminal antenna system, that comprises one or more of the following features. In embodiments, an ESA may be used as an RF feed to illuminate a main reflector; and, in such embodiments, the ESA may be attached to an rotating, extendable and retractable structure that articulates so as to be able to orient the ESA such that is able to steer one or more ESA beams directed towards one or more satellites, such that the ESA is in direct communication with the one or more satellites. In embodiments, an ESA is used as an RF feed to illuminate a main reflector, which may be a parabolic reflector, or subreflector. In cases in which a subreflector comprises the invention, the VSAT antenna configuration may be a Cassegrain, Gregorian, Nasmyth or other configuration, and an ESA beam is directed to the subreflector, which in turn reflects the beam into the main reflector, whereupon the main reflector reflects the beam towards a satellite in order to communicate with the satellite. In any of the embodiments, the ESA may, simultaneously with directing a beam at a main reflector or subreflector, also direct at least one second beams directly towards one or more satellites, such that the ESA is in direct communication with the one or more satellites. In cases in which the satellite communications terminal, or the satellite communications terminal antenna system of the invention communicates with more than one satellite, each communication may be in different or the with satellites in the same frequency or different frequency bands, and the satellites may be in the same or different orbital configurations, network or constellations, or constellation, in any combination, and for any number of satellites.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating exemplary embodiments of the invention and are not to be construed as limiting the invention. In the drawings:

FIG. 1 also depicts at least one subarray within the ESA for directing at least one additional beam.

In the drawings, like callouts refer to like elements.

DETAILED DESCRIPTION OF THE INVENTION

Figure 1A:
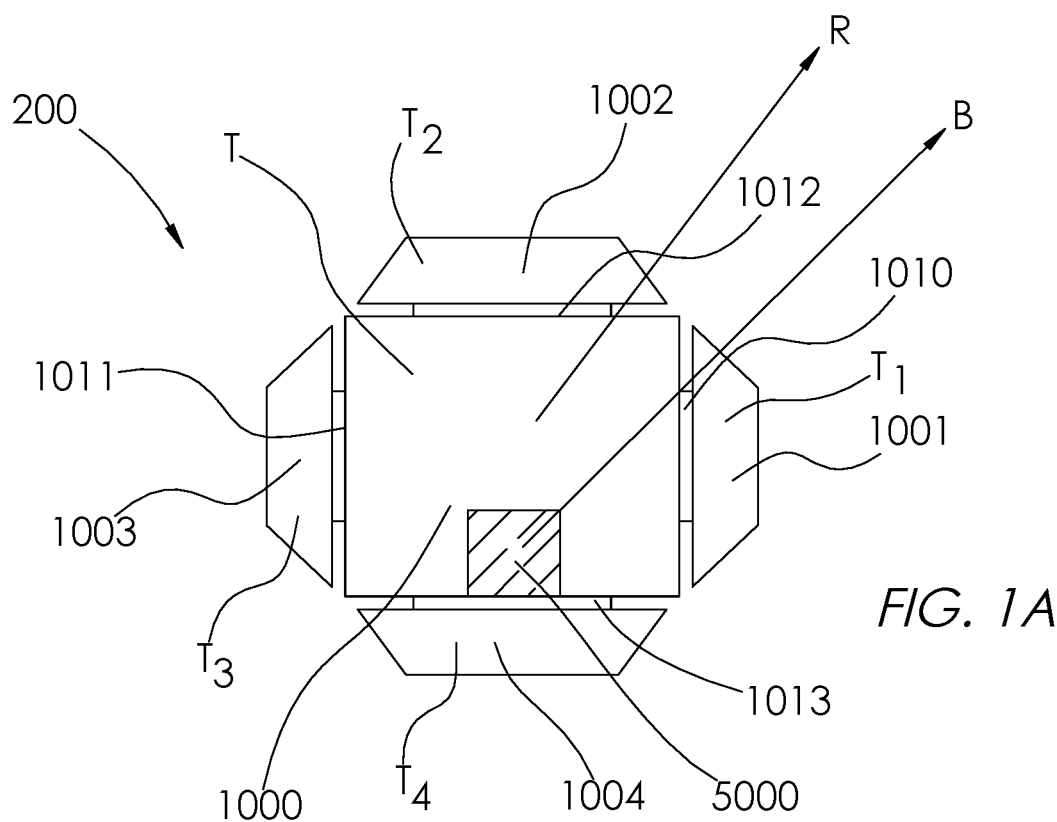
FIG. 1A depicts a top view of an exemplary embodiment of an electronically scanned (or steered) array (ESA) 200 for directing an RF beam towards a satellite. The ESA depicted in FIG. 1 incorporates optional ESA extension panels in order to selectively increase antenna gain as may be required to provide enough gain to communicate with a particular satellite, or to achieve desired RF beam B and R characteristics, such as, for example, beamwidth.

The following documentation provides a detailed description of the invention.

Although a detailed description as provided in this application contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus, the scope of the invention should be determined by the appended claims and their legal equivalents, and not merely by the preferred examples or embodiments given.

As used herein, "radiating" and "irradiating" are used, as a matter of convenience, to refer and to include within their meaning RF energy propagating in both directions along a path. Thus, a first element may be described as "radiating" along a certain path or into a reflector. It is to be understood that, when referring to an element of the invention such an ESA, "radiating" and "irradiating" include RF energy radiating from the element, and RF energy being received by the element. As a further example, an ESA irradiating a reflector with RF energy is also understood to be able to receive RF energy from that reflector, and that radiation patterns are meant to describe, generally, the directions in which an element both radiates and receives RF energy. When "receiving", "transmitting", "radiating" or other terms are used herein to describe or refer to a communication element, it is understood that such terms include within their meaning bi-directional communication and energy flow, despite the use of a unidirectional term such as "radiating", "transmitting" or "emitting". I.e., a satellite, ground terminal or communication system element (such as, for example, a VSAT antenna) referred to herein as "receiving" or as operating as a "receiving" element includes within its meaning also transmitting (or radiating) and operation as a transmitting (or radiating) element. In other words, each of the communication links, systems and elements referred to herein may comprise both transmitting (or radiating) features and operation and receiving features and operation, even though they may be referenced only herein for convenience as, for example, radiating, receiving or transmitting elements.

As used herein, "directed at", "in the direction of", "towards" or "directed towards" includes within their meaning orienting an element that is characterized by a radiation pattern, such as an antenna, such that a desired gain of the element is directed in a desired direction, or towards an intended object. As an example, when referring to an antenna element such as an ESA radiating surface or a parabolic reflector, the radiation pattern may be characterized as having a main beam characterized by a desired gain, the main beam having a known angular orientation to a feature of the element—in this case, the beam is "directed towards" a desired target, such as a remote communicating terminal, when the element is oriented such that the main beam is pointed in the direction from the element to the desired target.

As used herein, "in communication" and "communicating with" mean that two terminals are in communication, meaning that the RF link between them provides sufficient Signal to Noise Ratio (SNR) for reliable communication between the two terminals.

As used herein, "Very Small Aperture Terminal", or "VSAT" is used as a term of convenience. "VSAT" includes within its meaning any size satellite communication terminal. While the term "VSAT" is typically understood to mean a satellite communication ground station or terminal having a main reflector size of three (3) meters or less, as used herein, "VSAT" includes within its meaning satellite communication ground stations or terminals having any main reflector size. This being said, in embodiments, the invention may comprise, but is not limited to, satellite communication ground stations or terminals having a main reflector size of three (3) meters or less, or, in embodiments, 1 meter or less. Further, "VSAT" includes within its meaning both geographically fixed, or stationary, satellite communication ground stations and mobile satellite communication ground stations, i.e., MVSATs. Mobile satellite communication ground stations (MVSATs) may be vehicle mounted, trailer mounted, mounted on airborne or seaborne platforms or other mobile platforms, and may be, but are not necessarily, capable of operating as a communication ground station terminal while moving.

As used herein, "satellite" includes within its meaning any individual satellite and any plurality, or network, of satellites, in any combination. Thus, "satellite" includes within its meaning any combination of satellites, whether or not such satellites are in the same network or orbital configuration.

As used herein, "secondary reflector" and "subreflector" have the same meaning.

As used herein, "disaggregated network" includes within its meaning a network of satellites that is formed from satellites from different orbital configurations, networks or constellations. Disaggregated networks are considered generally to be more robust and less vulnerable to attack, and thus the ability of a satellite communications terminal operate on disaggregated networks is seen as an improvement over the old art. "Disaggregated network" also includes within its meaning distributed space systems and distributed satellite systems, which in include within their meaning a system of multiple satellites designed to work together in a coordinated fashion. See Abbate, Evelyn A., *Disaggregated Imaging Spacecraft Constellation Optimization with a Genetic Algorithm* (2014). Theses and Dissertations, Dept. of the Air Force Air University, Air Force Institute of Technology, Wright-Patterson Air Force Base, Ohio, which is incorporated herein by reference in its entirety.

As used herein, "RF" means radio frequency radiating electromagnetic energy of any frequency, including but not limited to C-band, V-band, Q-band, X-band, Ku-band, and Ka-band energy, where, specifically," "X-band" includes within its meaning energy of any frequency or band of frequencies in the range of 9 GHz to 12 GHz; "Ku-band" includes within its meaning energy comprising any frequency or band of frequencies in the range of 12 GHz to 18 GHz; and "Ka-band" includes within its meaning energy of any frequency or band of frequencies in the range of 26.5 GHz to 40 GHz.

As used herein, "satellite" includes within its meaning any earth-orbiting satellite, in any orbital configuration, including LEO, MEO, GEO, non-GEO, and any other satellite orbit. "Satellite" includes within its meaning any body that is able to communicate via RF communication, for example, via an RF communications terminal or transponder located on the satellite.

As used herein, "non-GEO" includes within its meaning all satellite orbital configurations, or orbits, that are not geosynchronous orbits.

As used herein, "DRA" and "Direct Radiating Antenna" include within their meanings any antenna that directly communicates with the antenna of a remote terminal, such as a satellite, without an intervening reflector. I.e., as an example, a DRA antenna of a ground terminal or airborne terminal communicates directly with the antenna of an earth-orbiting satellite without any intervening reflector to provide additional gain. Continuing with this example, an intervening reflector is not needed because the ground (or airborne) terminal antenna and the satellite antenna provide sufficient G/T to close the RF link between the ground (or airborne) terminal and the satellite terminal.

As used herein, "ground terminal", "terminal", "communications terminal" and "earth terminal" are used interchangeably to refer to any communications terminal that is intended to communicate with a satellite. So, for example, "ground terminal", "terminal" and "earth terminal" each include within their meaning all types of terminals, including but not limited to ground terminals, shipboard terminals, and airborne terminals, and both mobile and stationary terminals, of all types, that are intended to communicate with one or more satellites.

As used herein "communications terminal" includes within its meaning all terminals, including but not limited VSATs and MVSATs.

In embodiments, the subject invention is a communications terminal such as VSAT or MVSAT, or, in embodiments, an antenna system for such a communications terminal, that provides users with a stationary or mobile satellite communications terminal that can be used quickly and seamlessly across various network service providers, including those with varied frequency bands such as, for example and not by way of limitation, any frequency band including but not limited to C-band, V-band, Q-band, X-band, Ku-band, and Ka-band; to communicate simultaneously with, or to switch between, satellites in the same or differing orbital configurations such as, for example and not by way of limitation, GEO, MEO, LEO and non-GEO; across different satellite constellations and in various use scenarios. The subject invention can accommodate a variety of satellite network architectures and use scenarios in a single, configurable design, without the need for significant, time-consuming and expensive hardware swap out and/or system reconfiguration in order to switch communication to be operable between satellites which may, for example, be in different orbital configurations or networks, or operating on different frequency bands. The subject invention can also accommodate operation on disaggregated networks.

It is an intention of the invention that it is adaptable to any configuration of communications terminal, including both mobile and fixed ground terminals. Thus, the invention not only comprises the antenna configurations shown in the figures of the drawings but any and all other communications terminal, and communication terminal antenna configurations, as well, such as antennas comprising cylindrical and/or truncated reflectors, as well as all communications terminal antenna configurations comprising tertiary feed designs. Further, the scope of the invention includes antenna configurations that comprise any number of positioners operating on reflectors, feeds, ESAs or other elements of the communications terminal antenna system. For example, embodiments may include several positioners that may be single, dual or multi-axis positioners, such that the base (i.e. main reflector) positioner or pedestal works in coordination with other positioners such as, for example, an independently controlled ESA positioner in order to achieve a desired antenna pointing.

The inventive communications terminal, which, again, may be a VSAT or MVSAT, and the inventive communications terminal antenna system, can operate on disaggregated satcom network platforms (government, commercial, international), multiple RF bands (for example C, V, Q, Ka, Ku, X or any other RF band), various baseband hardware and waveforms (commercial and government modems and waveforms, Flexible Modem Interface, and software defined radio), various orbital architectures (GEO, MEO, LEO), and various operational deployment scenarios (At the Quick Halt or ATQH, On-The-Move or OTM).

The elements of the inventive communications terminal, which, again, may be a VSAT or MVSAT, and the inventive communications terminal antenna system, may be configured in several different ways, as described in relation to the figures below.

Figure 1B:
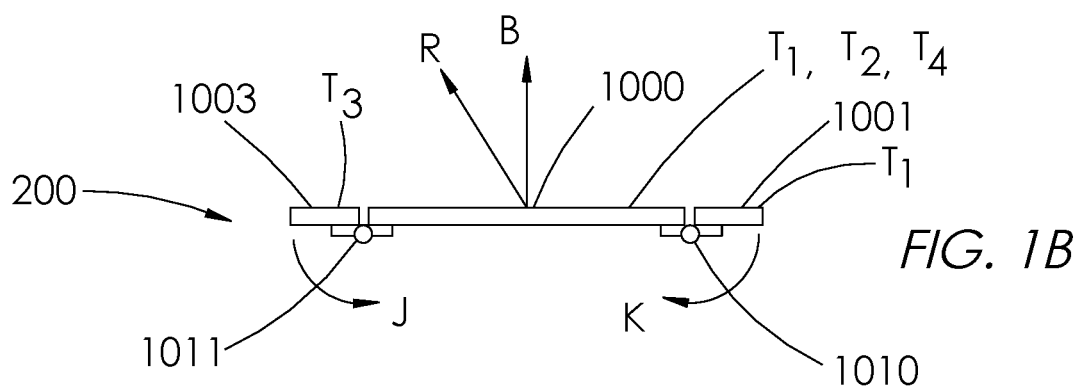
FIG. 1B depicts a side view of the exemplary embodiment of the ESA 200 of FIG. 1, with ESA extension panels deployed so as to increase the effective ESA radiating area, increasing ESA antenna gain.
Figure 1C:
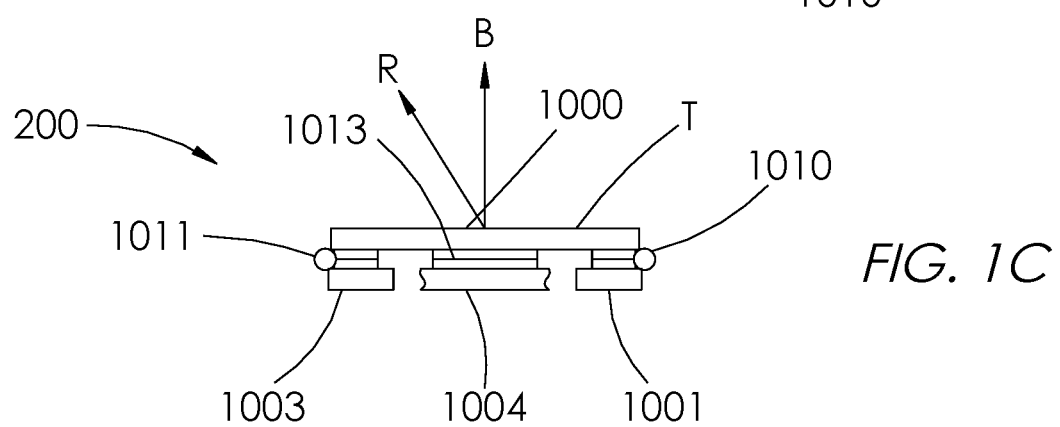
FIG. 1C depicts a side view of the exemplary embodiment of the ESA 200 of the invention, showing ESA extension panels in a stowed position in which they do not operate to increase the effective ESA radiating area.

Referring now to FIGS. 1A-1C, an exemplary embodiment of an ESA 200 that comprises an element of the inventive communications terminal, and the inventive communications terminal antenna system, is presented. ESAs comprising the present invention may be any ESA, including ESAs that comprise a main ESA radiating element assembly 1000 having a plurality of radiating elements, and which may be characterized has having a radiating surface area T and radiating one or more independently steerable RF beams such as B and R; and ESA 200 may, in embodiments, further be characterized as having one or more additional ESA extension panels each ESA extension having additional radiating elements, such as first ESA extension panel 1001, second ESA extension panel 1002, third ESA extension panel 1003, fourth ESA extension panel 1004, and so on, for any number of ESA extension panels, each ESA extension panel being characterized as having its own radiating surface area and each ESA extension panel in electrical communication with main ESA radiating element assembly 1000 such that the addition of one or more of the ESA extension panels serves to increase the overall radiating surface area of ESA 200. In this manner, the gain and beam steering characteristics of ESA 200 may be tailored to a specific application, for example, in the case in which antenna system 001 requires additional gain in the DRA configuration of FIG. 2A than it requires in the configuration of FIG. 2B. The ESA extension panels such as 1001-1004 may take any shape or outline as required by a specific application (in other words, the shape of the ESA extension panels 1001-1004, and the shape of the main ESA radiating elements assembly 1000, may take any shape and are not required to take the shape shown in FIGS. 1A-1C). The ESA extension panels such as 1001-1004 may be attached to main ESA radiating element assembly 1000 by any mechanical means of attachment known in the mechanical arts. In the non-limiting, exemplary embodiments of FIGS. 1A-1C, ESA extension panels such as 1001-1004 are depicted as being attached to main ESA radiating element assembly 1000 by a rotating means of attachment such that they may be rotated into place as shown in FIGS. 1A and 1B, providing a total ESA 200 radiating surface comprising the combined radiating surfaces of main ESA radiating element assembly 1000 plus the radiating surfaces of ESA extension panels 1001-1004. In FIG. 1C, ESA extension panels 1001-1004 have been rotated away from the radiating surface of ESA 200 on rotatable attachments 1010, 1011, 1012, and 1013, along the direction of arrow K (see FIG. 1B), such that they do not form a part of the radiating surface of ESA 200. In the configuration shown in FIG. 1C, no ESA extension panels form a part of the radiating surface of ESA 200: only the radiating surface of main ESA element 1000 forms a part of the radiating surface of ESA 200. It is a feature of the invention that the ESA extension panels may be attached to ESA 200 by any means, such as simple manual attachment via an attaching structure such that their radiating surface forms an ESA 200 radiating surface along with the radiating surface of main ESA element 1000; sliding ESA extensions panels that slide into place such that their radiating surface forms an ESA 200 radiating surface along with the radiating surface of main ESA element 1000; a rotatable attachment as depicted in FIGS. 1A-1C, and so on. The radiating surfaces of ESA 200 may be surface T for the main ESA element 1000, and surfaces T1-T4 for the ESA extension panels 1001-1004, respectively. By employing ESA extension panels 1001, 1002, 1003, and 1004, the effective radiating area of ESA 200 may be increased to $T+T_1+T_2+T_3+T_4$, effectively increasing the gain of ESA 200 as each ESA extension panel is added. ESA 200 may radiate any number of beams such as beam B or R from one or more of its radiating surfaces.

Referring now to FIG. 1A, in embodiments, ESA 200 (which may comprise any combination of main ESA 1000 and ESA extension panels 1001-1004), may be controlled or configured to comprise one or more ESA subarrays 5000, one of such ESA subarrays depicted in exemplary fashion as the cross-hatched area 5000 in FIG. 1A. ESA 200 may comprise any number of subarrays 5000. Each subarray 5000 has its own radiating area depicted in exemplary fashion as the cross hatched area in FIG. 1. Each subarray 5000 may be controlled to produce an independent, independently steerable, RF beam, such as RF Beam B or R, for directing at a reflector or for communicating directly with a remote terminal such as a satellite. The radiating area of ESA 200 that is not cross hatched in FIG. 1 represents the main ESA array, which produces its own independently steerable beam. Thus, ESA 200 may comprise a main ESA array and one or more ESA subarrays 5000, the main ESA array and each ESA subarray 5000 each producing its own RF beam, each beam having a controllable direction. The main ESA array, and each subarray 5000, each typically comprise a plurality of radiating elements that are independently fed with an RF signal, each RF signal controlled so as to have a specific phase relationship with the other RF signals feeding the radiating elements in the main array or subarray, in order to achieve a particular beam characteristic, such as the direction of the main beam of the radiation pattern for each main array or subarray. In this manner, the main array and each subarray 5000 may produce independently steerable radiation patterns, each independently steerable radiation pattern having a main beam direction that is controllable by a user. Thus, for ESA 200, the main array and each subarray may be controlled to produce independently steerable RF beams, where each RF beam may be in the same or a different frequency bands as the other RF beams produced by the ESA 200. And so a single ESA 200 may be able to communicate with more than one satellite, in the same or different frequency bands, where each satellite may be in the same or different orbital configuration and moving in different directions, at different velocities. At the same time, the ESA 200 is able to direct an independent beam toward a main reflector (or subreflector, as in the case of a Cassegrain, Gregorian, or Nasmyth reflector configuration) in order to take advantage of the gain of the reflector configuration to communicate with a remote terminal or transponder, such as, for example a GEO satellite transponder.

Figure 2A:
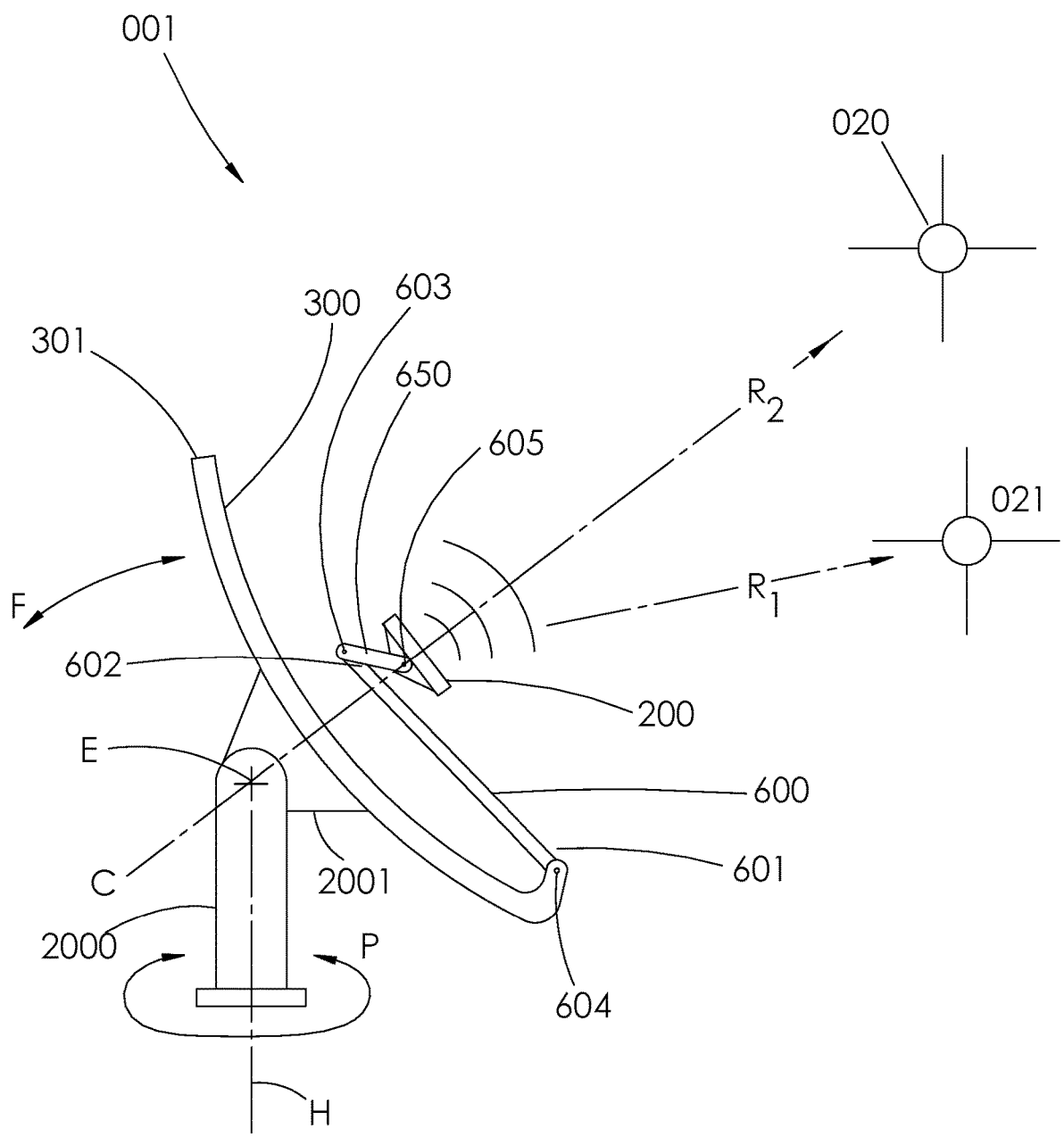
FIG. 2A depicts an embodiment of the invention which comprises an ESA 200 used in conjunction with a main reflector, which may be a parabolic reflector. In the example shown, in which the ESA 200 is in the second position, the ESA beam R may be used to communicate directly with a second satellite. ESA 200 may radiate one or more beams R for communicating directly, and concurrently, with multiple second satellites, which may be in different orbital configurations, forming a Direct Radiating Antenna (DRA) configuration. A pedestal, which may comprise a single, dual or three-axis positioner, may be used to steer the ESA as desired in order to direct the radiated beams at a satellite so as to communicate efficiently with the satellite. In embodiments, the first and second earth orbiting satellites may be the same satellite.
Figure 2B:
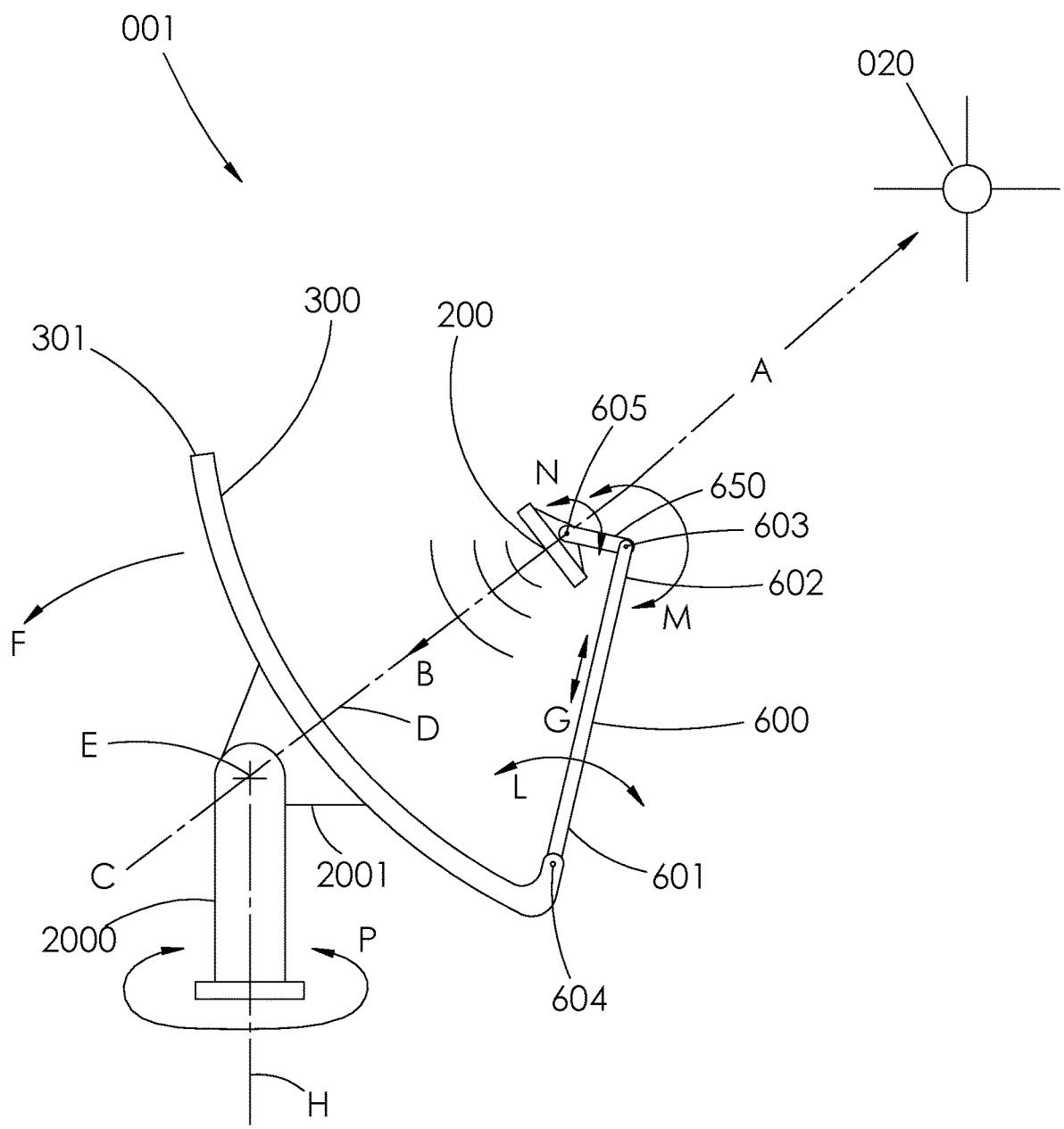
FIG. 2B depicts a side view of an embodiment of the invention in which comprises an ESA used in combination with a reflector, which may be a parabolic reflector. In the example shown, in which the ESA 200 is in the first position, the ESA beam B is directed at the main reflector, which reflects the beam to the first satellite. A pedestal may be used to steer the parabolic reflector as desired in order to communicate efficiently with a satellite. The ESA may be used to steer the beam in order to communicate efficiently with a satellite.

Referring now to FIGS. 2A and 2B, an embodiment of the satellite communications terminal, and the inventive satellite communications terminal antenna system, of the invention 001 is depicted which has a first position in which ESA 200 is used as an RF feed for the VSAT in a first position (see FIG. 2B), wherein the VSAT main reflector reflects RF beam B from ESA 200 towards a first satellite 020 for communicating with first satellite 020; and wherein the VSAT has a second position (see FIG. 2A), in which ESA 200 is translated and rotated such that ESA 200 directly radiates one or more RF beams such as $R_1$ and $R_2$ towards one or more earth orbiting satellites 020 and 021 directly, in a DRA configuration. ESA 200 may be rotatably or otherwise disposed, or attached, to a second feed arm 650 at rotatable attachment 605. The rotatable attachment 605 of ESA 200 to the second feed arm 650 enables rotation of ESA 200 in the direction of arrows N (see FIG. 2B). The second feed arm 650 may be, in turn, rotatably attached at a rotatable attachment 603 to the second end 602 of a first feed arm other structure 600. The rotatable attachment 603 of the second feed arm to the second end 602 of the first feed arm 600 enables rotation of the first feed arm 600 along the direction of arrows M relative to the second end 602 of the first feed arm 600 (see FIG. 2B). The first end 601 of the first feed arm, or boom, 600, may be rotatably or otherwise attached at rotatable (or other) attachment 604 to a portion of the main reflector 300 or to a structure 301 that is attached to the main reflector 300. The rotatable attachment 604 of the first end 601 of the first boom 600 to the reflector structure 301 enables rotation of the first feed arm 600 along the direction of arrows L (see FIG. 2B). Feed arm 600 may be extendable or retractable by any means known in the mechanical arts, such as, for example, electric linear actuators, pneumatic or hydraulic actuators, ball screws, or any other structure that is controllably extendable or retractable.

Still referring to FIGS. 2A and 2B, while reflector 300 may be parabolic in shape, it is not necessary that the main reflector 300 be parabolic in shape. Main reflector 300 may, in embodiments, be characterized by an axis C which is the "boresight" axis of the reflector. When the cross-sectional shape of the reflector is parabolic, the reflector surface forms a circulator paraboloid having an axis C. A spherical wave generated by a point source (such as ESA 200, when ESA 200 is in the first position) placed at the focus of the parabola may be reflected into a beam characterized by a plane wave by the main reflector, propagating as a collimated beam along the direction A, which may be co-axial with axis C, in the direction of satellite 020.

Still referring to FIGS. 2A and 2B, the rotation of the ESA 200, second feed arm 650, and first feed arm 600 along arrows L, N and M, and the ability of feed arm 600 to extend and to retract, enable ESA 200 to be positioned at, or in proximity to, the focal point of a parabolic (or other shape) main reflector 300 as shown in FIG. 2A. Thus, ESA 200 may be rotated and positioned so that its beams such as $R_1$ and $R_2$ are directed outwards and may be used to radiate directly towards, or to receive directly from, one or more satellites such as 020 and 021, which may be in any orbital configuration, network or constellation, establishing ESA 200 and communications terminal 001 in a second position in which ESA 200 communicates directly with one or more satellites via ESA RF beams such as $R_1$ and $R_2$ in a DRA configuration. The ESA 200 antenna extension panels may physically extend, or rotate into position, as described above and depicted in FIGS. 1A-1C, for added gain or to achieve desired ESA radiating beam characteristics, such as a desired gain or beamwidth. Thus, in this embodiment, the ESA 200 may either be oriented in a first position (see FIG. 2B) to radiate ESA RF beam B toward the main reflector 300 in order to take advantage of the gain and beamwidth of the main reflector 300 as it reflects the energy radiated from ESA B in direction A towards a first satellite 020 as shown in FIG. 2A; or, alternatively, it may be rotated, or flipped, and motivated into a second position (see FIG. 2A) to radiate outwards $R_1$ and $R_2$ directly towards one or more satellites 020 and 021 in a Direct Radiating Antenna (DRA) configuration as shown in FIG. 1. Satellites 020 and 021 may be, but are not necessarily, the same earth-orbiting satellite. For example, satellite 020 may be in a GEO and may comprise a Ku band transponder, while satellite 021 may be in a MEO or LEO orbit and may comprise an X band transponder. The satellite communications terminal, and the inventive satellite communications terminal antenna system, of the invention is able to continuously point to, and to communicate with, both satellites, even though they are in different orbital configurations, and are communicating in different RF frequency bands.

Figure 3A:
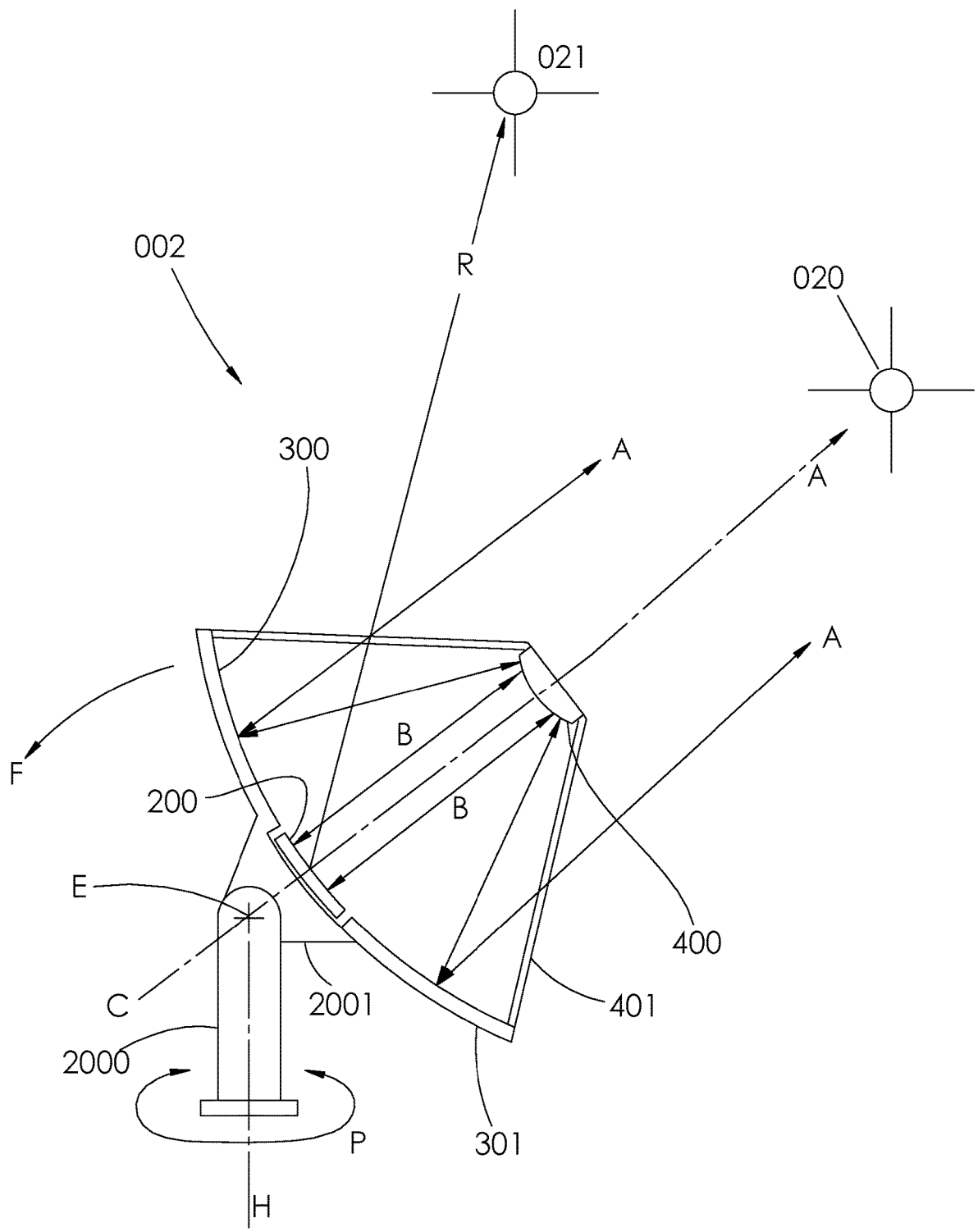
FIG. 3A depicts a side view of an embodiment of the invention in a Cassegrain configuration, which an ESA 200 is located at the vertex of a parabolic reflector. The ESA radiates toward a convex subreflector, that in turn radiates a main parabolic reflector that has a radiation pattern that is then used to communicate directly with a satellite. A pedestal may be used to steer the parabolic reflector as desired in order to communicate efficiently with a satellite. The ESA may be used to steer the beam in order to communicate efficiently with a satellite. ESA 200 may radiate one or more beams R for communicating directly, and concurrently, with multiple second satellites, which may be in different orbital configurations, forming a Direct Radiating Antenna (DRA) configuration.
Figure 3B:
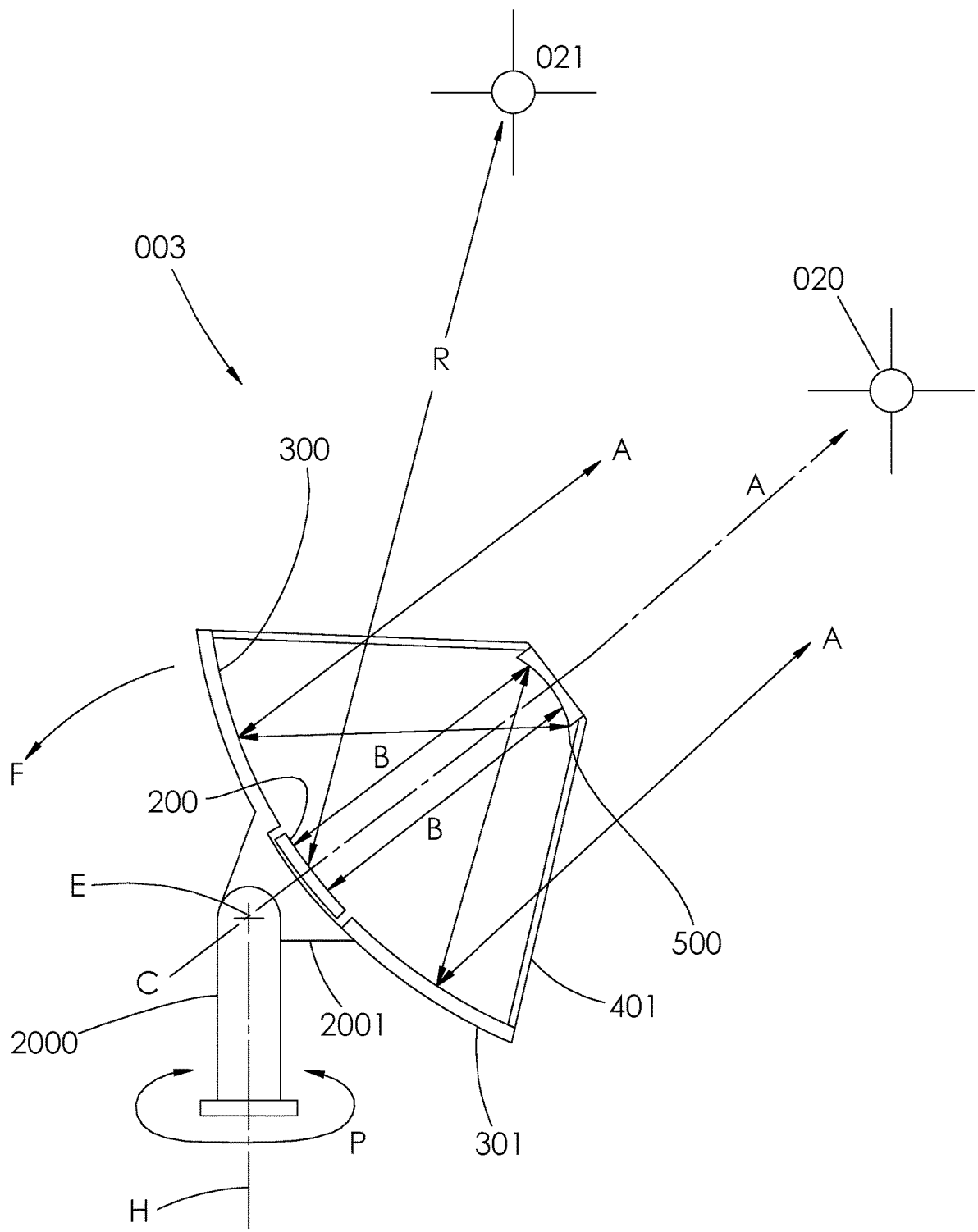
FIG. 3B depicts a side view of an embodiment of the invention in a Gregorian configuration, which an ESA 200 is located at or near the vertex of a parabolic reflector. The ESA radiates a beam towards a concave subreflector, that in turn reflect the beam toward a main parabolic reflector, whose radiation pattern is then used to communicate directly with the satellite. A pedestal may be used to steer the parabolic reflector as desired in order to communicate efficiently with the satellite.

Referring now to FIGS. 3A and 3B, embodiments of the satellite communications terminal, and the satellite communications terminal antenna system, of the invention are depicted in which the antenna system of the invention is configured in a Cassegrain configuration 002 (FIG. 3A) or Gregorian configuration 003 (FIG. 3B), in which an ESA 200 may be located, for example, at or near the vertex of a parabolic or other shaped main reflector 300. The ESA 200 may radiate at least one beam, for example, a first beam B and second beam R. The ESA 200 may be located at any location that allows it to function as described herein, but, in embodiments, it may be located along a surface of the main reflector 300 and oriented such that it directs first beam B towards a convex subreflector 400 (FIG. 3A) or concave subreflector 500 (FIG. 3B) that may, for example, be positioned in the beam of the main reflector 300. In embodiments, convex subreflector 400 (FIG. 3A) or concave subreflector 500 (FIG. 3B) may be located at a focal point of main reflector 300. The subreflector 400 or 500 in turn reflects the first beam B RF energy from the ESA towards the main reflector 300, which may be, but is not necessarily, parabolic in shape, which in turn reflects the beam RF energy from main reflector 300 outward in the direction A towards a first earth-orbiting satellite 020, enabling communication directly between VSAT 002 and first satellite 020, which may be in any orbital network, constellation or configuration. A pedestal 2000, which may be in communication with support structure 2001 for supporting reflector support structure 301 and main reflector 300, may be used to steer the main reflector 300 as desired in order to keep its beam A pointed at the satellite. Subreflector (or secondary reflector) 400 or 500 may be supported by one or more support structures 401 which are in communication with subreflector 400 or 500 on a first end, and in communication with support structure 301 on a second end.

Still referring to FIGS. 3A and 3B, in embodiments, the at least one electronically scanned array beam may further comprise at least one and, in embodiments, more than one, second beam R directed from the electronically scanned array 200 directly towards one or more second earth-orbiting satellites 021. In embodiments, ESA 200 may radiate a third beam, a fourth beam, and so on, each beam directed towards a different satellite.

Figure 4A:
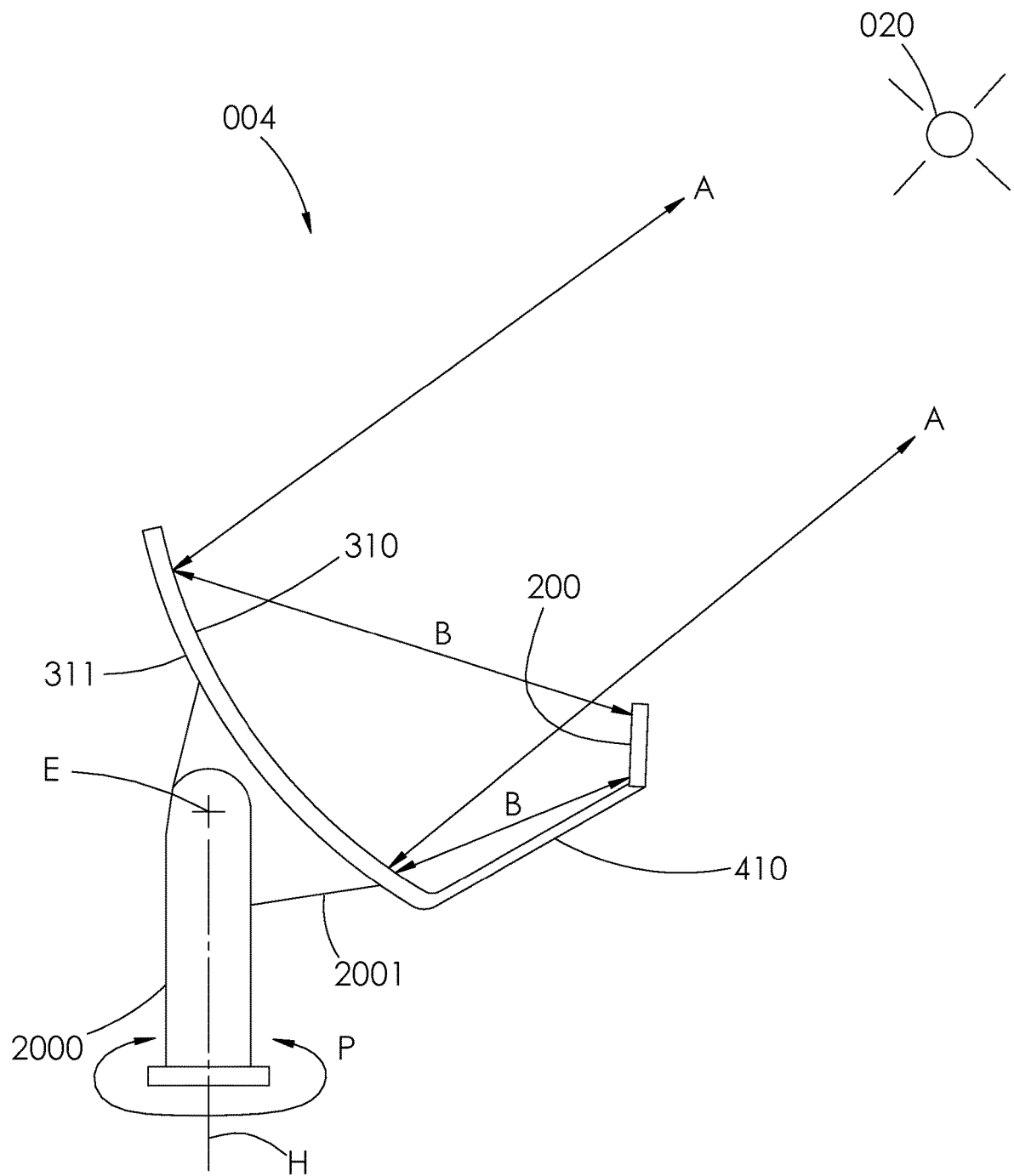
FIG. 4A depicts a side view of an embodiment of the invention comprising an off-axis or offset reflector in which an ESA is located so as to radiate upwards into the main reflector.

Referring now to FIG. 4A, an embodiment of the satellite communications terminal, and the inventive satellite communications terminal antenna system, of the invention 004 comprising an off-axis or offset main reflector 310, in which an ESA 200 is located and oriented so as to irradiate a main reflector 310, is depicted. Energy radiated from ESA 200 in beam B towards the main reflector 310 is reflected by main reflector 310 outwards in the direction A towards the satellite 020, which may be in any network or orbital configuration. ESA 200 may be located so as to radiate upwards into main reflector 310 as shown in FIG. 4A in a bottom feed configuration. In embodiments, the shape of the reflective surface of main reflector 310 may optionally comprise a portion of a parabola, and ESA 200 may be located at a focal point of the parabola defining reflector 310. ESA 200 may be supported by one or more support structures 410 which are in communication with ESA 200 on a first end, and in communication with support structure 311 on a second end.

Figure 4B:
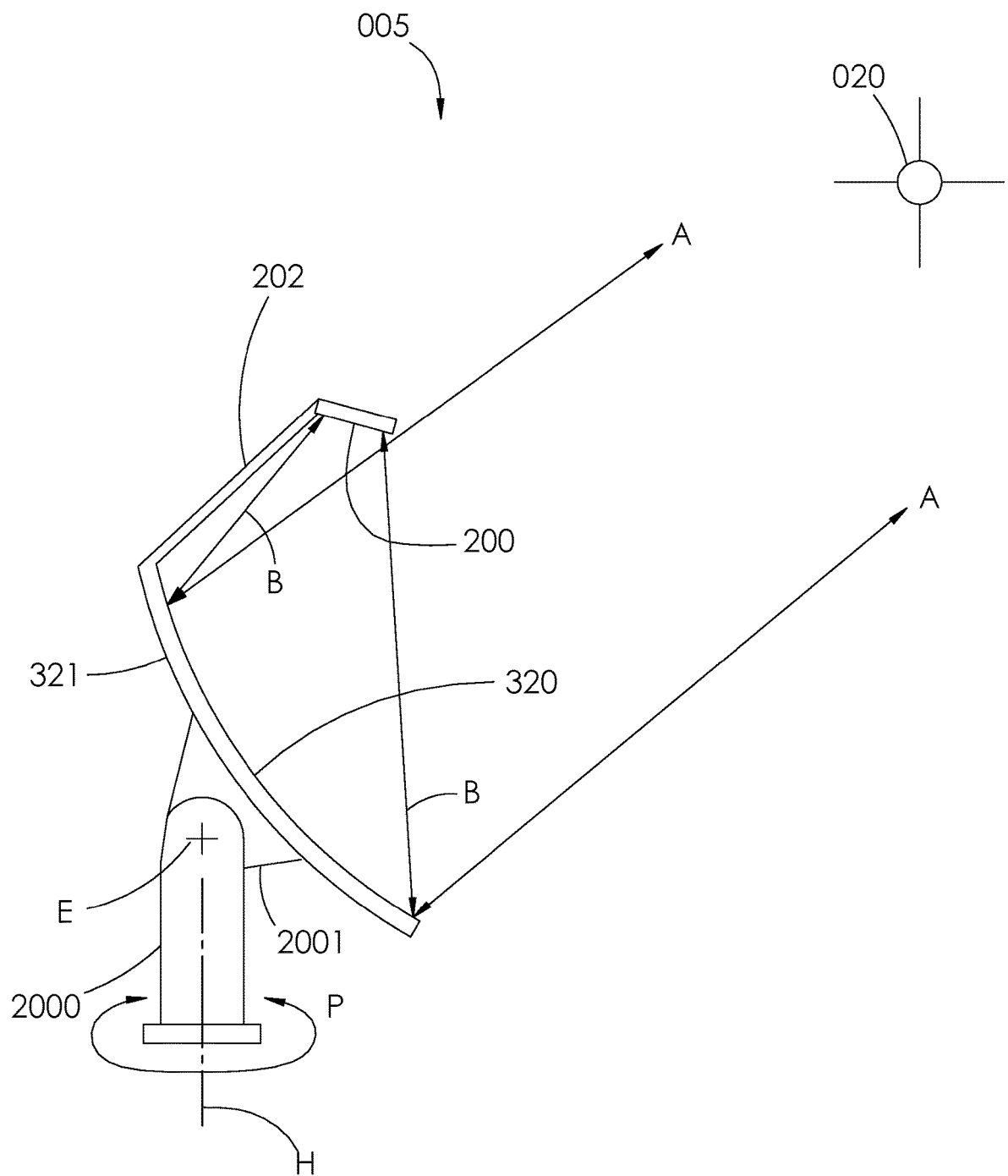
FIG. 4B depicts a side view of an embodiment of the invention comprising an off-axis or offset reflector in which an ESA 200 is located so as to radiate downwards into the reflector, which may be a parabolic main reflector.

Referring now to FIG. 4B, an embodiment of the satellite communications terminal, and the inventive satellite communications terminal antenna system, of the invention 005 comprising an off-axis or offset main reflector 320, in which an ESA 200 is located and oriented so as to irradiate a main reflector 320, is depicted. Energy radiated from ESA 200 in beam B towards the main reflector 320 is reflected by main reflector 320 outwards in the direction A towards the satellite 020, which may be in any network, constellation or orbital configuration. ESA 200 may be located and may be oriented so as to radiate downwards into main reflector 320 as shown in FIG. 4B in a top feed configuration. In embodiments, the shape of the reflective surface of main reflector 320 may optionally comprise a portion of a parabola, and ESA 200 may be located at a focal point of the parabola defining reflector 320. ESA 200 may be supported by one or more support structures 202 which are in communication with ESA 200 on a first end, and in communication with reflector support structure 321 on a second end.

Figure 4C:
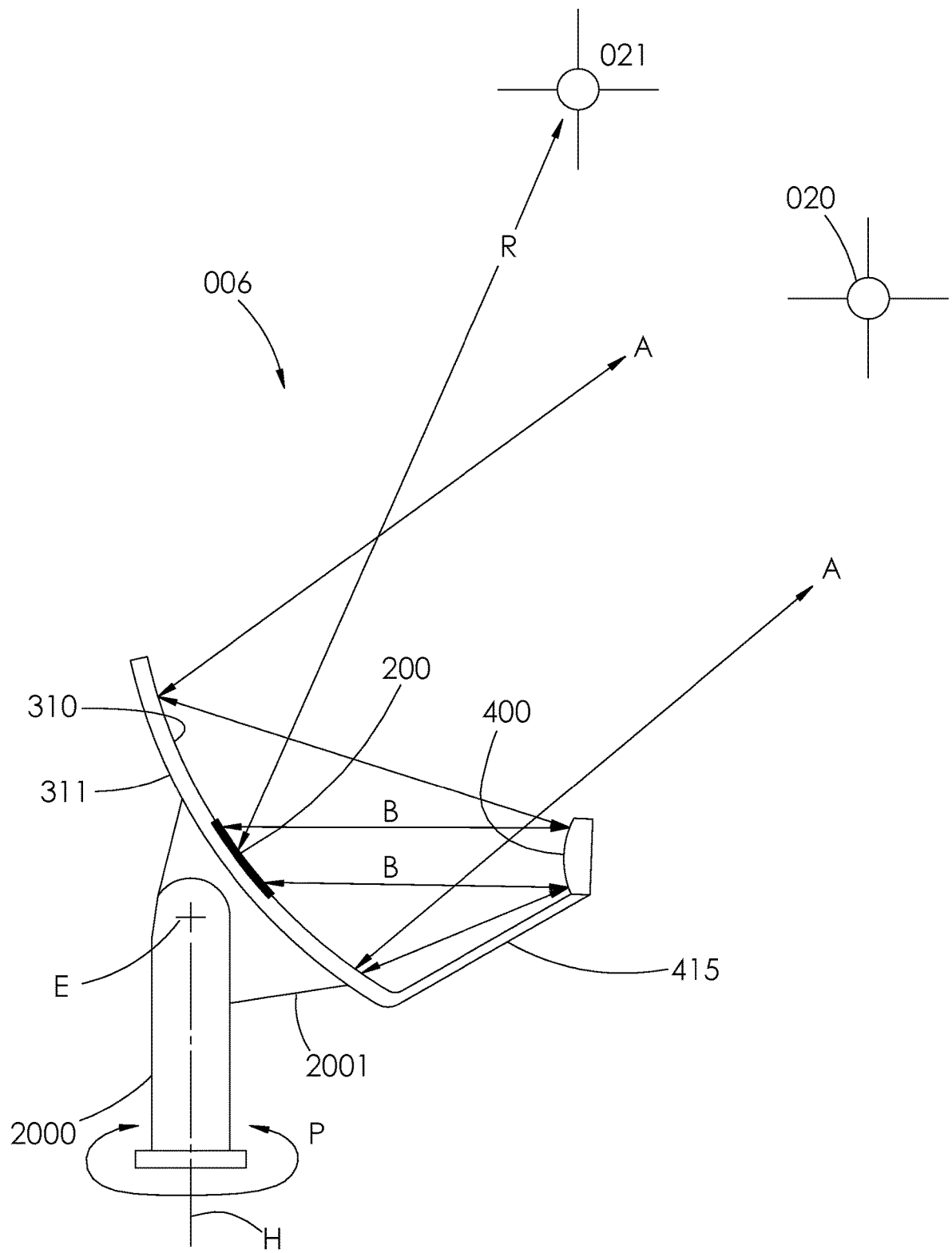
FIG. 4C depicts a side view of an embodiment of the invention comprising a Cassegrain off-axis or offset reflector in which an ESA 200 is located so as to radiate towards a convex subreflector, which reflects into a main reflector which reflects outward towards a satellite. In the exemplary embodiment shown, the ESA is located along the surface of the main reflector, and the subreflector is located below the main reflector. The ESA may also be configured to radiate directly to one or more satellites in a DRA configuration.
Figure 4D:
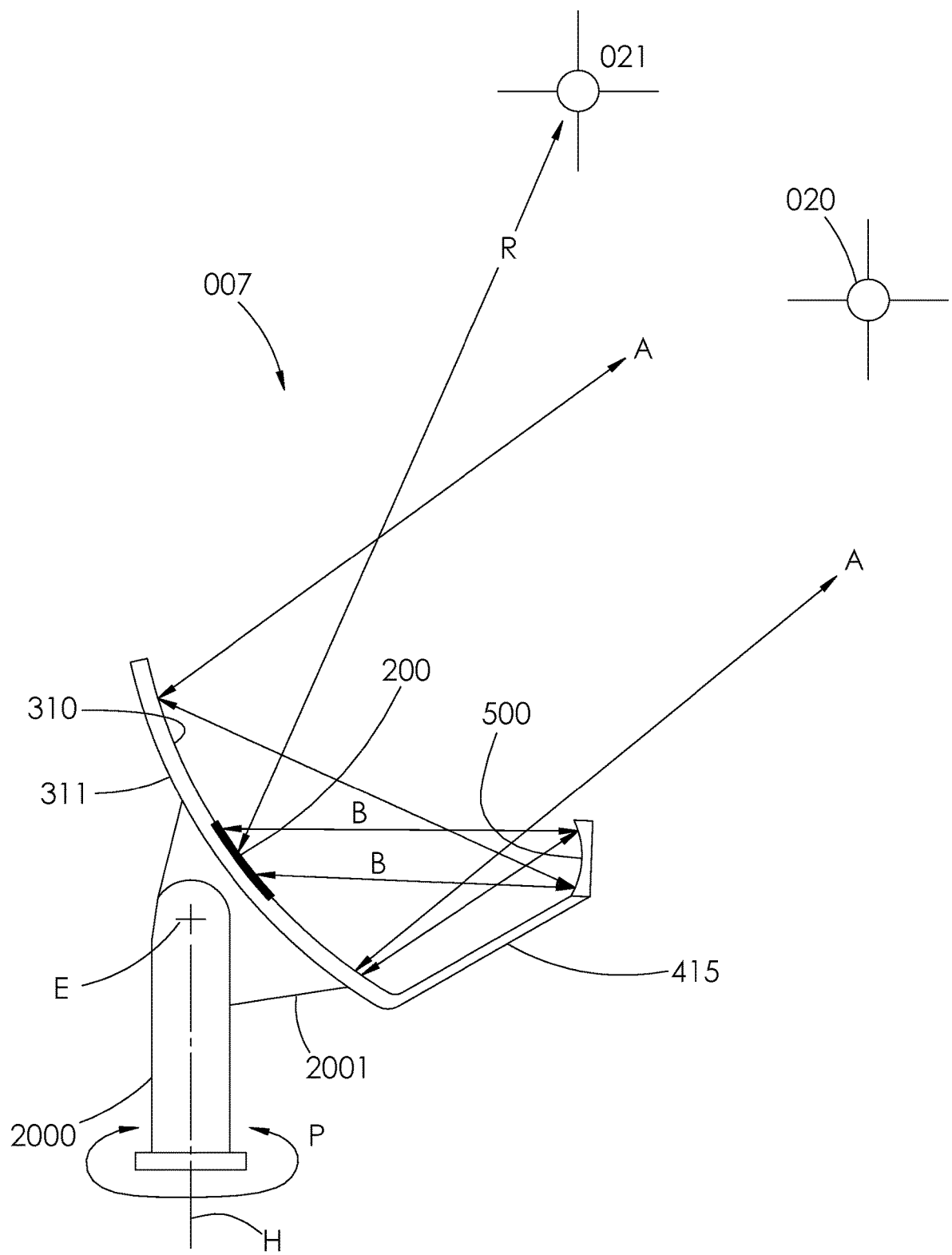
FIG. 4D depicts a side view of an embodiment of the invention comprising a Gregorian off-axis or offset reflector in which an ESA is located so as to radiate towards a concave subreflector, which reflects into a main reflector which reflects outward towards a satellite. In the exemplary embodiment shown, the ESA is located along the surface of the main reflector, and the subreflector is located below the main reflector. The ESA may also be configured to radiate directly to one or more satellites in a DRA configuration.

Referring now to FIGS. 4C and 4D, embodiments of a Cassegrain 006 (FIG. 4C) or Gregorian configuration 007 (FIG. 4D) bottom feed version of the system of the invention comprising off-axis or offset main reflector 310 are depicted. An ESA 200 may be located so as to radiate a first beam B towards a convex subreflector 400 (FIG. 4C) or concave subreflector 500 (FIG. 4D), which in turn reflects the beam into the main reflector 300, which in turn reflects the beam outward A towards a first satellite 020. The ESA 200 may also radiate a second (or more) beam(s) R directly towards one or more second satellite(s) 021. The ESA 200 may be, but is not necessarily, located along a surface of the main reflector 310, and the subreflector 400 or 500 may be located below the main reflector 310. In the VSAT embodiment 006 shown in FIG. 4C, the reflective surface of subreflector 400 is convex in shape (Cassegrain configuration). In the VSAT embodiment 007 depicted in FIG. 4D, the reflective surface of the subreflector 500 is concave in shape (Gregorian configuration). In these embodiments, or in any embodiment in which the ESA radiating surface is disposed so as to radiate towards a reflector of the VSAT and also simultaneously radiate outwardly from the VSAT towards a satellite, such as the embodiments depicted in FIGS. 2A, 3A, 3B, 4C, 4D, 4E, 4F, 6A and 6B, ESA 200 may radiate a first beam B in a first direction towards subreflector 400 or 500 and may also radiate one or more second beam(s) R skyward directly towards one more second earth-orbiting satellite(s)

021. In these embodiments, the first beam B may be oriented towards subreflector 400 or 500, which reflects the first beam towards main reflector 300 (see, for example FIG. 3A), 310 (see, for example FIG. 4C), or 320 (see FIG. 6A), where it is reflected by the main reflector and is directed outward from the VSAT in a first intended direction A toward a first antenna forming part of a first communication system (e.g. a first satellite) 020. The one or more second beam(s) R may also simultaneously radiate from ESA 200 outward from the VSAT along R directly towards one or more second antenna(s) forming part of one or more second communication system(s) (e.g. one or more second satellite(s)) 021. The first and second beams may operate in the same or different frequency bands. The first and second communication systems may form part of the same or different orbiting satellites, networks, constellations, or orbital configurations. Thus, in the embodiments in which the ESA 200 radiating surface is disposed so as to radiate towards a reflector of the communications terminal antenna system and also simultaneously radiate outward from the communications terminal antenna system towards one or more second satellite(s) in a DRA configuration, the communications terminal, and the communications terminal antenna system, may simultaneously communicate with a first satellite 020 and one or more second satellite(s) 021, or with first and second RF terminals on a single satellite. The first and second satellites may be disposed in the same, or different, orbital configurations, networks or constellations: i.e., the first satellite may be in a first orbital configuration (for example GEO), the communications terminal, and the communications terminal antenna system, communicating with the first satellite via the first beam A, in which the higher gain of a parabolic main reflector may be helpful in closing the link, and the second satellite may be disposed in a second orbital configuration (for example LEO, MEO or other non-GEO), the communications terminal, and the communications terminal antenna system, communicating with the second satellite via the second ESA beam R directly radiated from lower gain ESA 200. In embodiments, ESA 200 may, but does not necessarily, radiate the first and second beams simultaneously, enabling simultaneous communication with the first and one or more second communication systems, which may be, for example, different satellites in different orbital configurations, or different communications transponders on the same satellite. ESA 200 is not limited to radiating only one second beam directly towards a satellite; it may radiate a plurality of beams, each of the beams in the same or different frequency bands, directly towards a plurality of satellites, simultaneously. This is the case in any of the embodiments of the invention in which ESA 200 is configured in the communications terminal antenna system such that is able to radiate a first beam towards a main reflector or subreflector, and also radiate outwards from the VSAT directly towards one or more second satellites. So, for example, ESA 200 may comprise two or more beams R radiating outward from the VSAT directly towards different satellites in the same or different orbital configurations and possibly in different RF frequency bands. And so on, for additional direct ESA beams when ESA 200 is used to communicate directly with one or more satellites via one or more beams R, as in a DRA configuration. The first and one or more second directions may each be independently steerable by any combination of electronic (i.e. scan) steering or mechanical steering, or both in combination. In embodiments, the first direction may be at least partially determined by mechanically steering the main reflector, and the second (and additional) directions may be at least partially determined by electronically steering the ESA second (and additional) beam(s). Subreflector (or secondary reflector) 400 or 500 may be supported by one or more support structures 415 which are in communication with subreflector 400 or 500 on a first end, and in communication with support structure 311 on a second end. Again, this is true for any of the embodiments of the invention in which ESA 200 is configured in the communications terminal antenna system such that is able to radiate a first beam towards a main reflector or subreflector, and also radiate outwards from the communications terminal antenna system directly towards one or more second satellites, i.e., in DRA configurations.

Figure 4E:
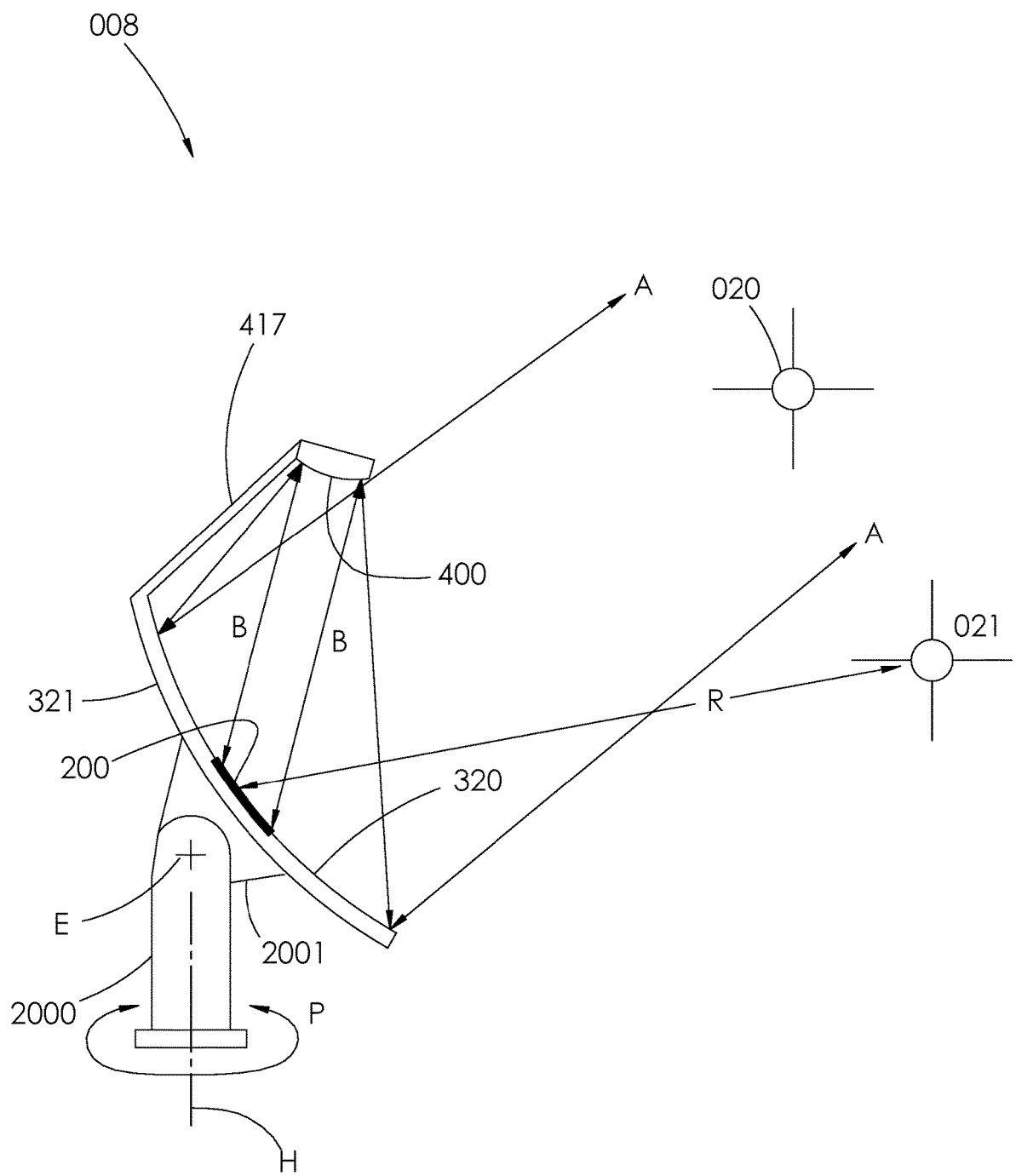
FIG. 4E depicts a side view of an embodiment of the invention comprising a Cassegrain off-axis or offset reflector in which an ESA 200 is located so as to radiate towards a convex subreflector, which reflects into a main reflector which reflects outward towards the satellite. In the exemplary embodiment shown, the ESA is located along the surface of the main reflector, and the subreflector is located above the main reflector. The ESA may also be configured to radiate directly to one or more satellites in a DRA configuration.
Figure 4F:
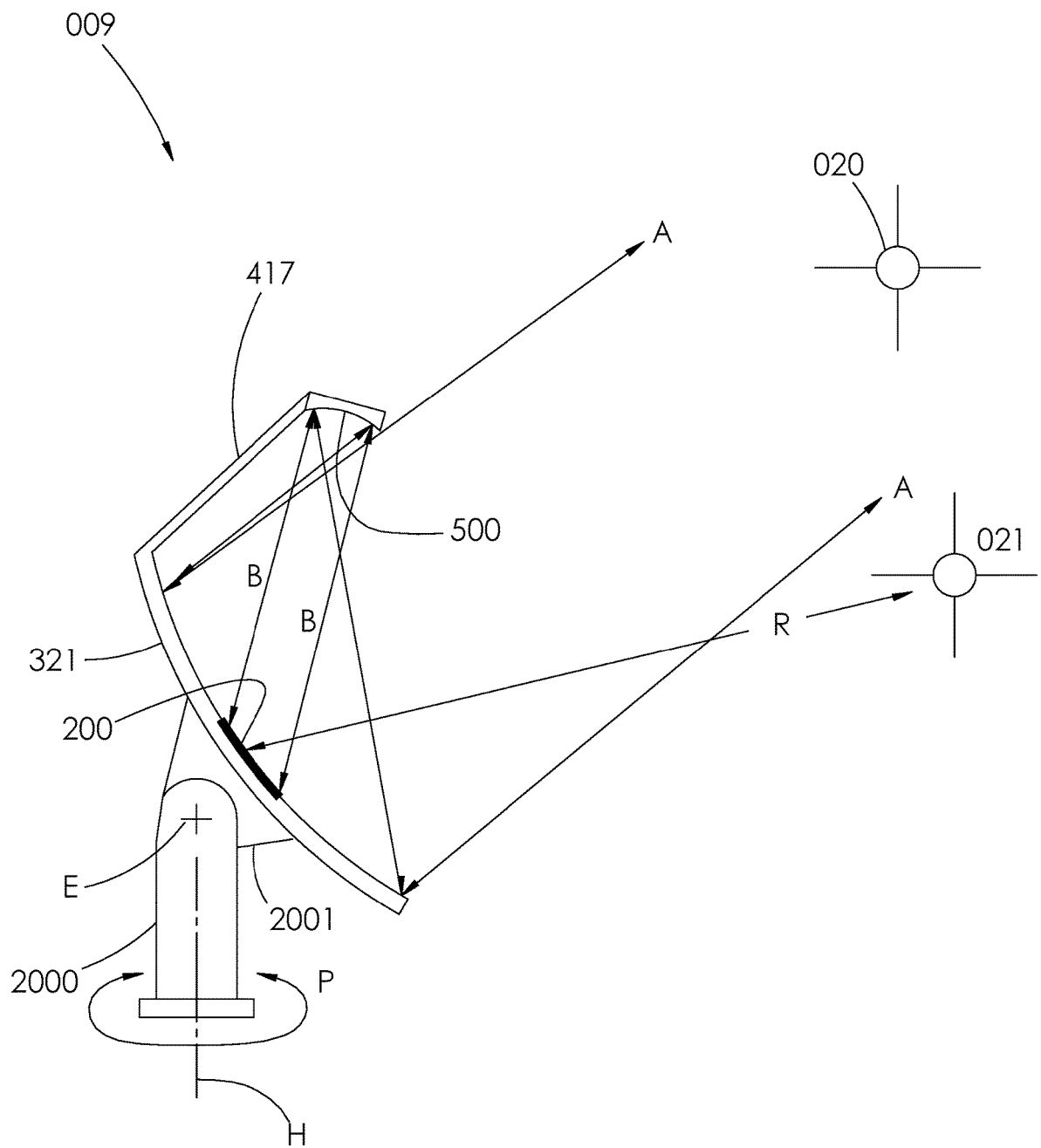
FIG. 4F depicts a side view of an embodiment of the invention comprising a Gregorian off-axis or offset reflector in which an ESA 200 is located so as to radiate towards a concave subreflector, which reflects into a main reflector which reflects outward towards a first satellite. In the exemplary embodiment shown, the ESA is located along the surface of the main reflector, and the subreflector is located above the main reflector. The ESA may also be configured to radiate directly to one or more satellites in a DRA configuration.

Referring now to FIGS. 4E and 4F, an embodiment of a communications terminal antenna system of the invention, which may be a Cassegrain configuration (the 008 configuration depicted in FIG. 4E) or Gregorian configuration (the 009 configuration depicted in FIG. 4F) top feed version of the system of the invention comprising an off-axis or offset main reflector 320 is depicted. An ESA 200 may be located so as to radiate beam B towards a convex subreflector 400 (FIG. 4E) or concave subreflector 500 (FIG. 4F), which in turn reflects beam B into the main reflector 320, which in turn reflects the beam outward A towards a first satellite 020. The ESA 200 may be, but is not necessarily, located along a surface of the main reflector 320, and the subreflector 400 or 500 may be located above the main reflector 320. In the embodiment shown in FIG. 4E, the reflective surface of subreflector 400 is convex in shape. In the embodiment depicted in FIG. 4F, the reflective surface of the subreflector 500 is concave in shape. In these embodiments, the first ESA beam B may be oriented towards subreflector 400 or 500, which reflects the first beam B towards main reflector 320, where it is reflected by main reflector 320 and is directed outward from the VSAT in a first intended direction A toward a first antenna forming part of a first communication system (e.g. a first satellite) 020. ESA 200 may also radiate one or more second beam(s) R. The one or more second beam(s) R may radiate from ESA 200 outward from the VSAT 007 or 008 directly towards one or more second antennas forming part of one or more second communication system(s) (e.g. one or more second satellite(s)) 021. The first and second beams may operate in the same or different frequency bands. The first and second communication systems may form part of the same or different orbiting satellites. As mentioned above, in these embodiments, the communication terminal, and the communication terminal antenna system, of the invention may communicate with a first satellite and one or more second satellites, or with first and second transceivers on a single satellite. The first and one or more second satellites may be disposed in the same, or different, orbital configurations: i.e., the first satellite may be in a first orbital configuration (for example GEO), the communication terminal, and the communication terminal antenna system, communicating with the first satellite via the first beam A, in which the higher gain of a parabolic main reflector may be helpful in closing the link; and the one or more second satellites may be disposed in one or more second orbital configuration (for example LEO/MEO), the communication terminal, and the communication terminal antenna system, communicating with the second satellite via the second beam R directly radiated from lower gain ESA 200. In embodiments, the ESA 200 may radiate the first and second beams simultaneously, each of the beams in the same or different frequency bands, enabling simultaneous communication with satellites in the same, or different, orbital configurations. ESA 200 is not limited to radiating only one beam directly towards a satellite; it may radiate a plurality of beams. So, for example, ESA 200 may comprise two or more beams R radiating outward from the communications terminal antenna system directly towards two or more different satellites in the same or different orbital configurations. And so on, for any number of direct beams from ESA 200. The first and second directions may be independently steerable by any combination of electronic (i.e. scan) steering or mechanical steering, or both. The first and second directions may be independently steerable. In embodiments, the first direction may be at least partially determined by mechanically steering the main reflector, and the second (and additional) direction(s) may be at least partially determined by electronically steering the ESA second (and additional) beams. Subreflector (or secondary reflector) 400 or 500 may be supported by one or more support structures 417 which are in communication with subreflector 400 or 500 on a first end, and in communication with reflector support structure 321 on a second end.

Figure 5A:
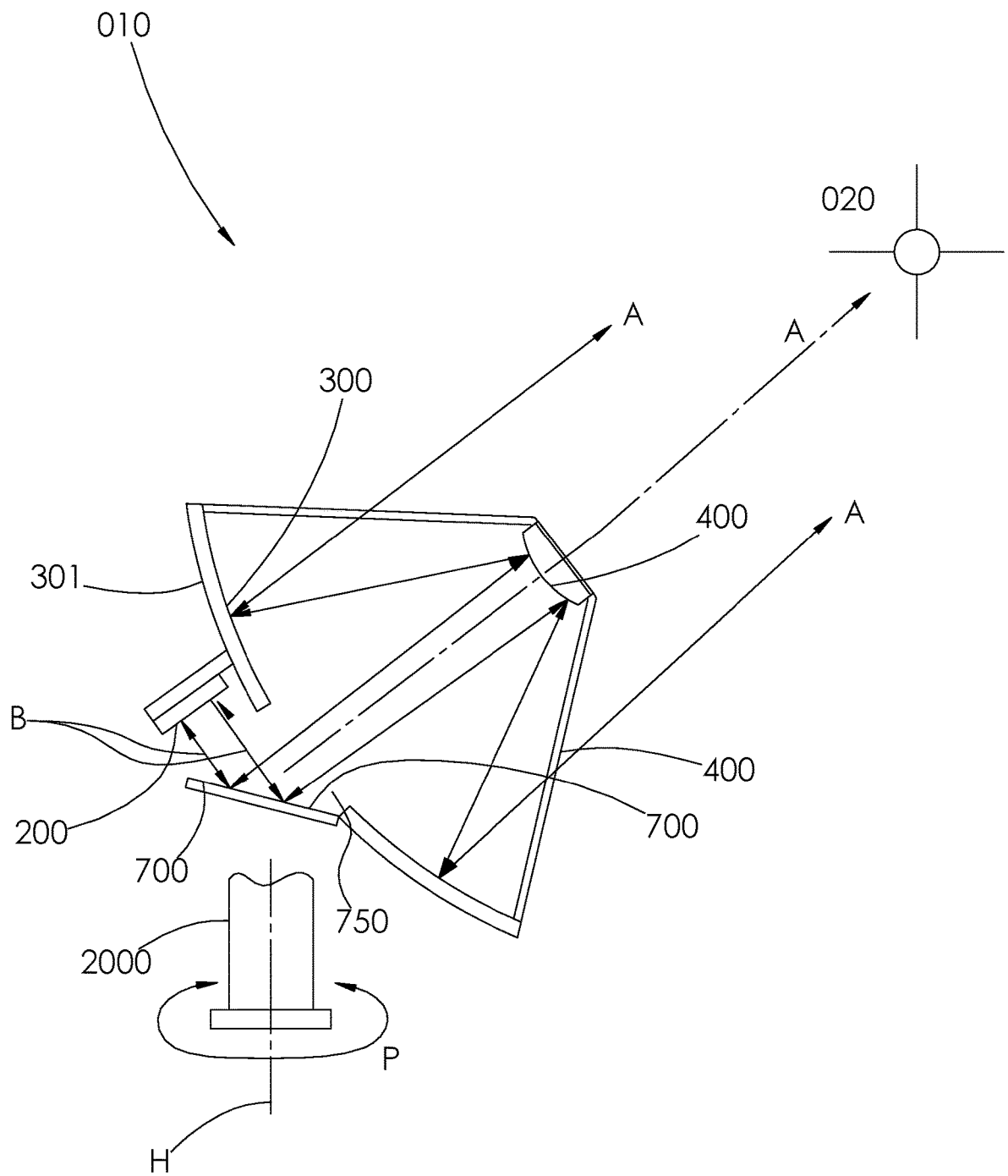
FIG. 5A depicts a side view of an embodiment of the invention comprising a Nasmyth Cassegrain configuration in which the ESA is positioned behind the main reflector. The ESA radiates RF energy to a tertiary reflector that reflects the RF energy through an opening in the main reflector and towards a subreflector positioned in front of the main reflector. The subreflector reflects the RF energy into the main reflector, which then reflects the RF energy outwards, directed towards a communication satellite. In the embodiment depicted in FIG. 5A, the subreflector comprises a convex reflecting surface.
Figure 5B:
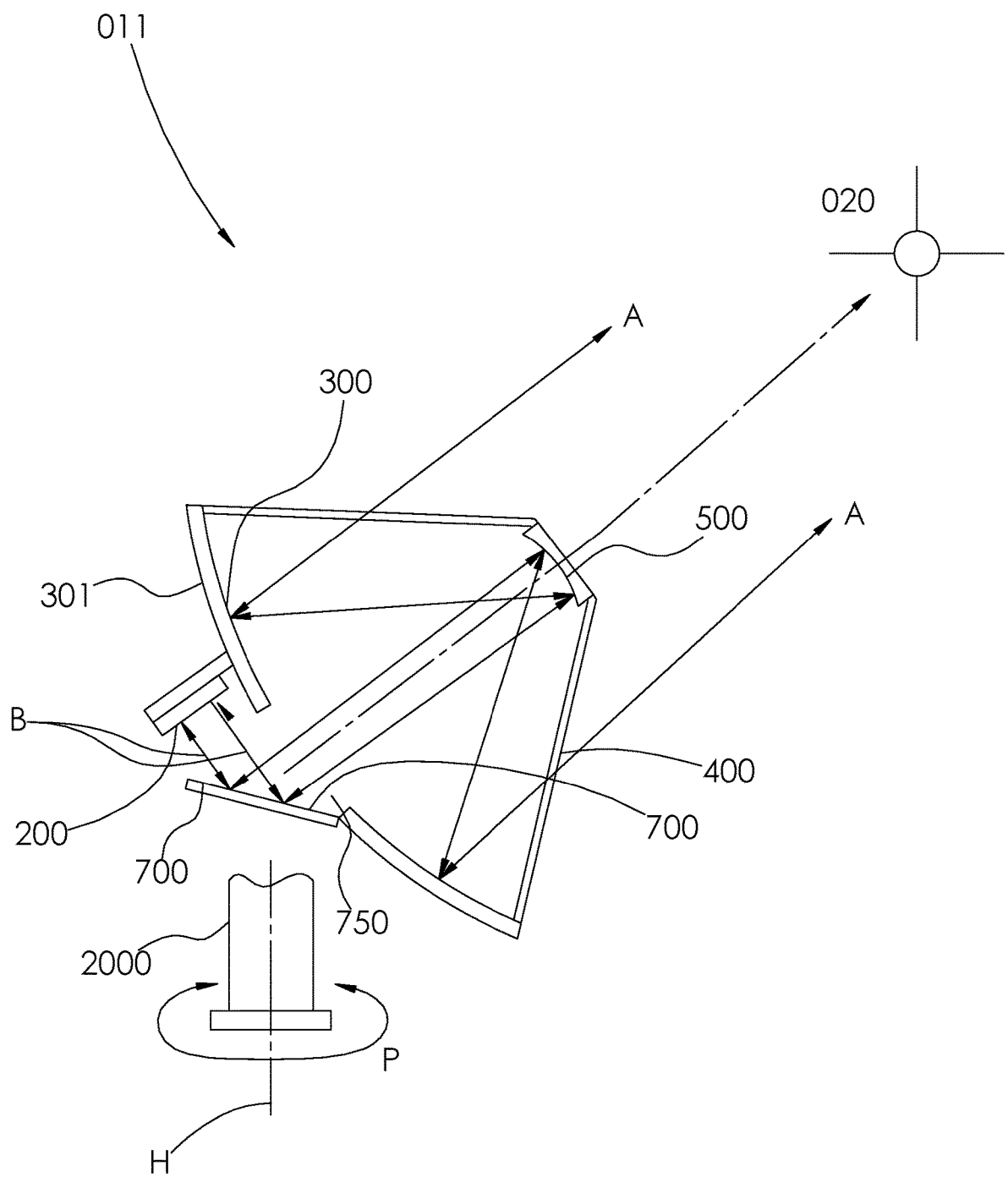
FIG. 5B depicts a side view of an embodiment of the invention comprising a Nasmyth Gregorian configuration in which the ESA is positioned behind the main reflector. The ESA radiates RF energy to a tertiary reflector that directs the radiated RF energy through an opening in the main reflector and towards a subreflector positioned in front of the main reflector. The subreflector reflects the RF energy into the main reflector, which then reflects the RF energy outwards, directed towards a communication satellite. In the embodiment depicted in FIG. 5B, the subreflector comprises a concave reflecting surface.

Referring now to FIGS. 5A and 5B, an embodiment of a communications terminal antenna system of the invention comprising a Nasmyth Cassegrain configuration 010 (FIG. 5A) or Nasmyth Gregorian configuration 011 (FIG. 5B) is depicted, in which ESA 200 is positioned behind the main reflector 300. The ESA 200 radiates RF beam B towards a tertiary reflector 700 that directs beam B through an opening 750 in the main reflector 300 towards a convex subreflector 400 (FIG. 5A) or concave subreflector 500 (FIG. 5B) positioned in front of the main reflector 300. The subreflector 400 or 500 reflects bean B RF energy into the main reflector 300, which then reflects the energy outwards A towards a satellite 020. In the embodiment depicted in FIG. 5A, the subreflector 400 comprises a convex reflecting surface (Nasmyth Cassegrain configuration). In the embodiment depicted in FIG. 5B, the subreflector 500 comprises a concave reflecting surface (Nasmyth Gregorian configuration). Subreflector 400 or 500 may be supported by attachment of a first end of support structure 400 to subreflector 400 or 500, and attachment of a second end of support structure 400 to main reflector support structure 301.

Figure 6A:
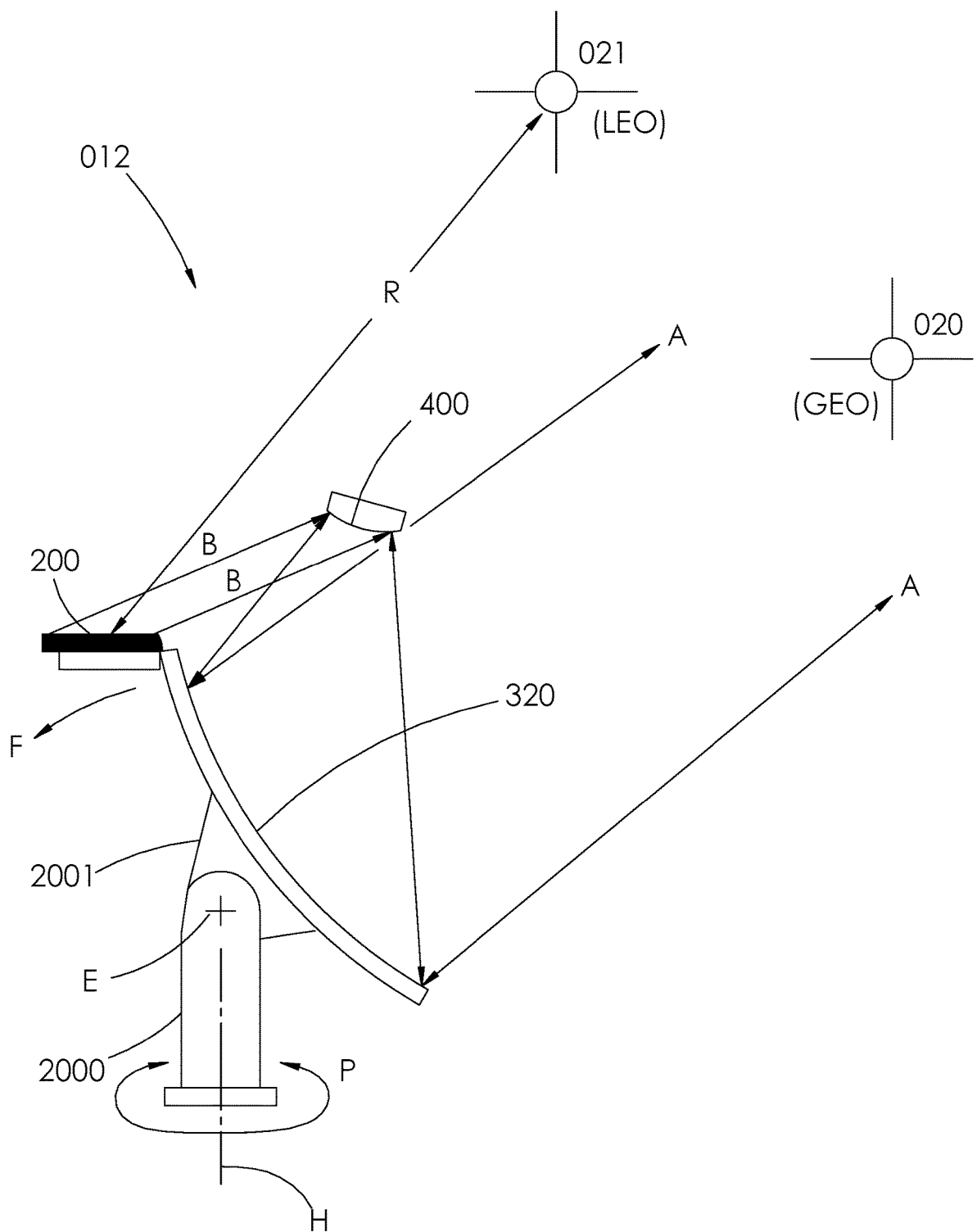
FIG. 6A depicts a side view of an embodiment of a offset Cassegrain top-fed VSAT antenna system 012 of the invention, presented as an exemplary embodiment of the invention, and also presented as a non-limiting use case in which an ESA 200 feeds a convex subreflector of the Cassegrain system in a first beam B, which beam is reflected into main reflector 320 by the subreflector, and in which the main reflector reflects the first beam to a first satellite for communicating with the first satellite; ESA 200 also simultaneously communicates with one or more second satellites via one or more second beams R. Links budgets for the exemplary uplinks and downlinks are provided in the written description.
Figure 6B:
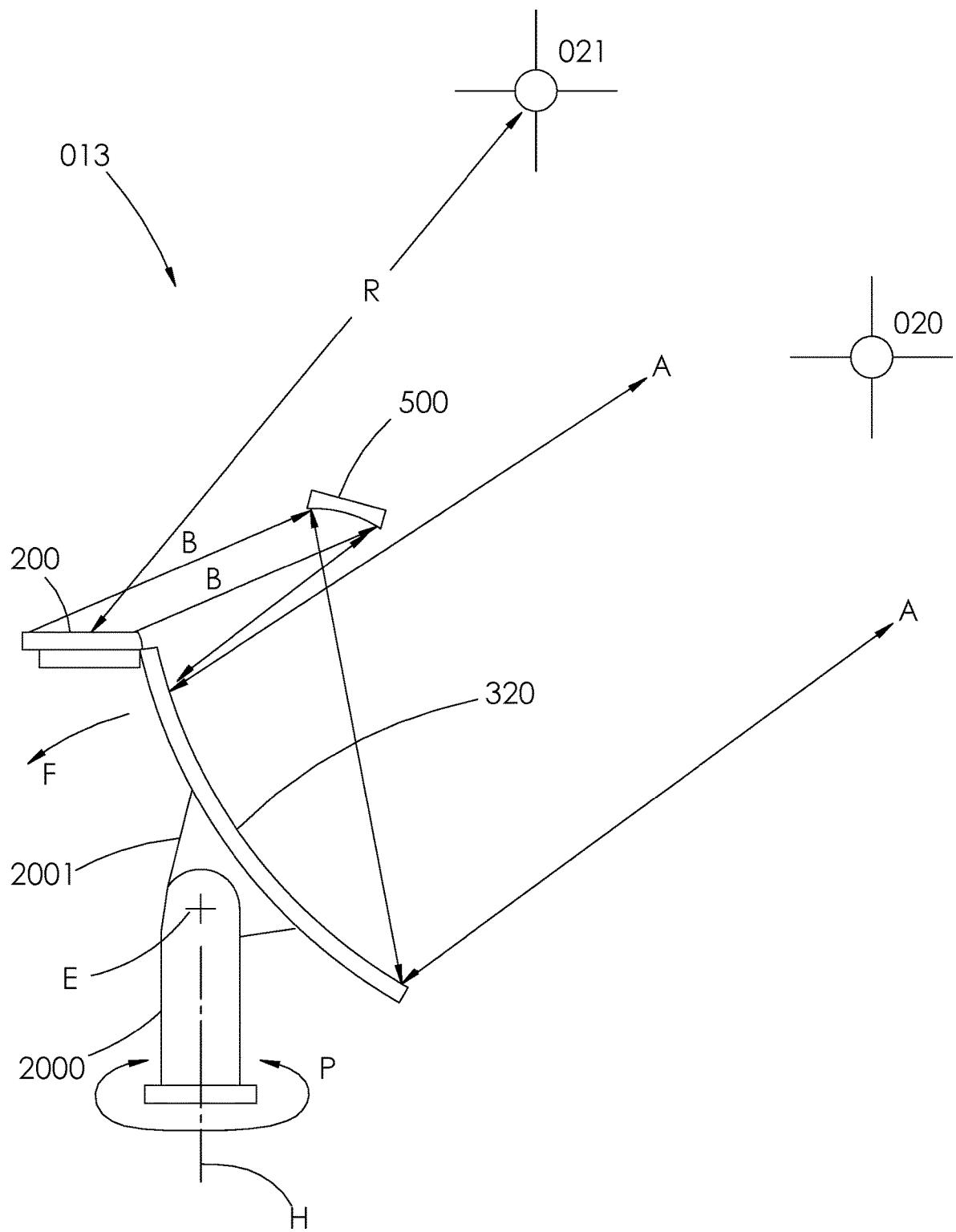
FIG. 6B depicts a side view of an embodiment of a top-fed offset Gregorian VSAT antenna system 013 of the invention, presented as an exemplary embodiment of the invention, and also presented as a non-limiting use case in which an ESA 200 feeds a concave subreflector of the Gregorian system in a first beam B, which beam is reflected into main reflector 320 by the subreflector, and in which the main reflector reflects the first beam to a first satellite for communicating with the first satellite; ESA 200 also simultaneously communicates with one or more second satellites via one or more directed second beams R from ESA 200.

Referring now to FIGS. 6A and 6B, an embodiment of a communications terminal antenna system of the invention, which is a top-fed offset Cassegrain antenna configuration 012, comprising an ESA RF feed 200, is depicted (FIG. 6A) and a top-fed offset Gregorian VSAT antenna configuration 013, comprising an ESA RF feed 200, is depicted (FIG. 6B). In these exemplary embodiments, ESA 200 may be located outside main reflector 320. ESA 200 may direct a first RF beam B towards convex subreflector 400 (FIG. 6A) or concave subreflector 600 (FIG. 6B), which in turn reflects RF beam B towards main reflector 320, which reflects the beam in a direction A toward a first satellite 020 for communicating with first satellite 020. At the same time, ESA 200 may direct one or more second beams R towards one or more second satellite(s) 021 for tracking and communicating with second satellite(s) 021. Main reflector 320 may be pointed such that its beam A is directed to first satellite 020 by the azimuth and elevation rotation of pedestal 2000 about axes H and E, respectively, as depicted by arrows F and H. Pedestal 2000 may be attached to reflector by structure 2001. The one or more second beams R from ESA 200 may be independently continuously pointed at the one or more second satellites 021 by the independent steering of one or more second beams R using, for example, one or more ESA subarrays, as described above.

Figure 6C:
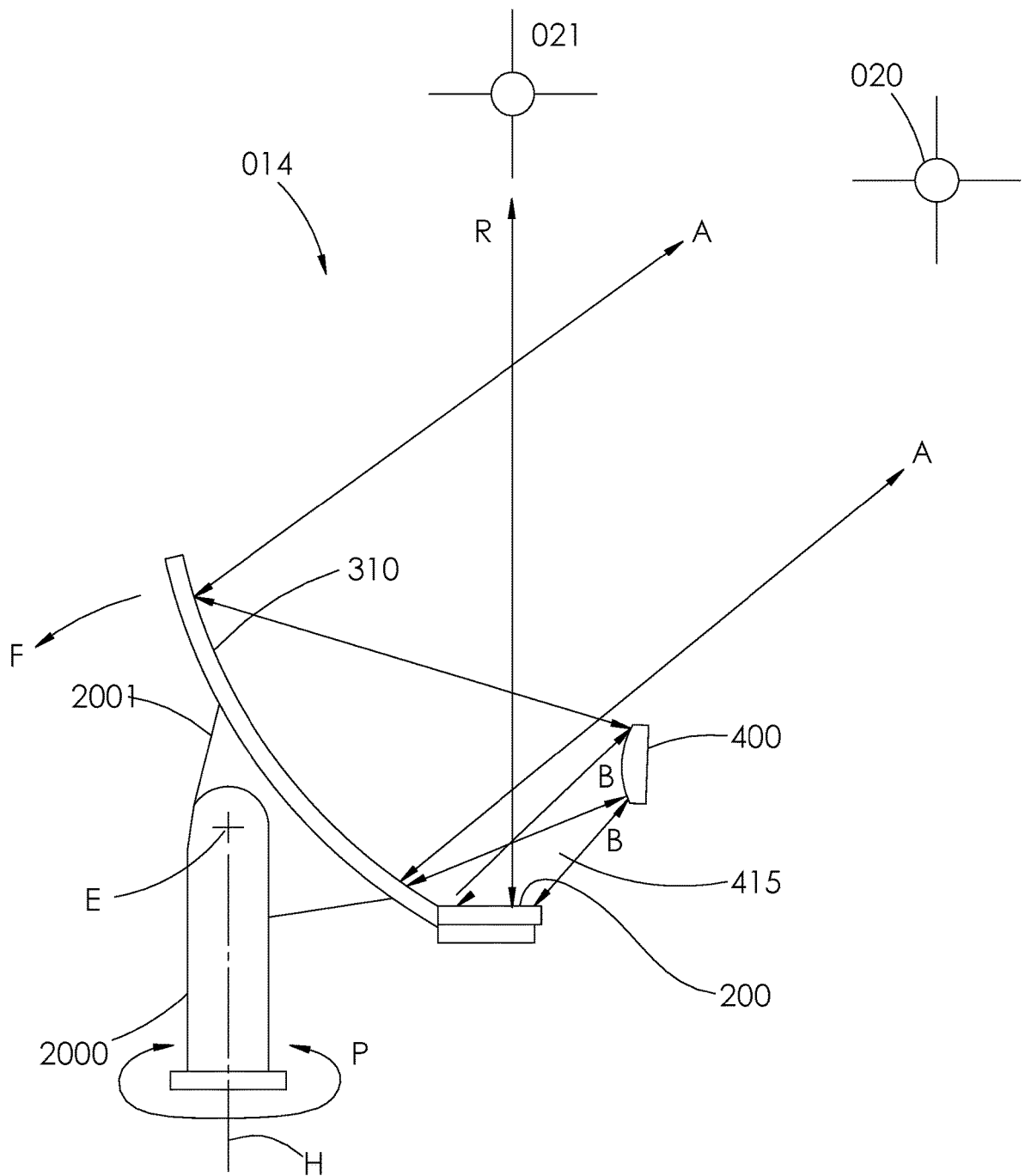
FIG. 6C depicts a side view of an embodiment of a bottom-fed offset Cassegrain VSAT antenna system 014 of the invention, presented as an exemplary embodiment of the invention, and also presented as a non-limiting use case in which an ESA 200 feeds a convex subreflector of the Cassegrain system in a first beam B, which beam is reflected into main reflector 320 by the subreflector, and in which the main reflector reflects the first beam to a first satellite for communicating the first satellite; ESA 200 also simultaneously communicates with one or more second satellites, via one or more directed second beams R from ESA 200.
Figure 6D:
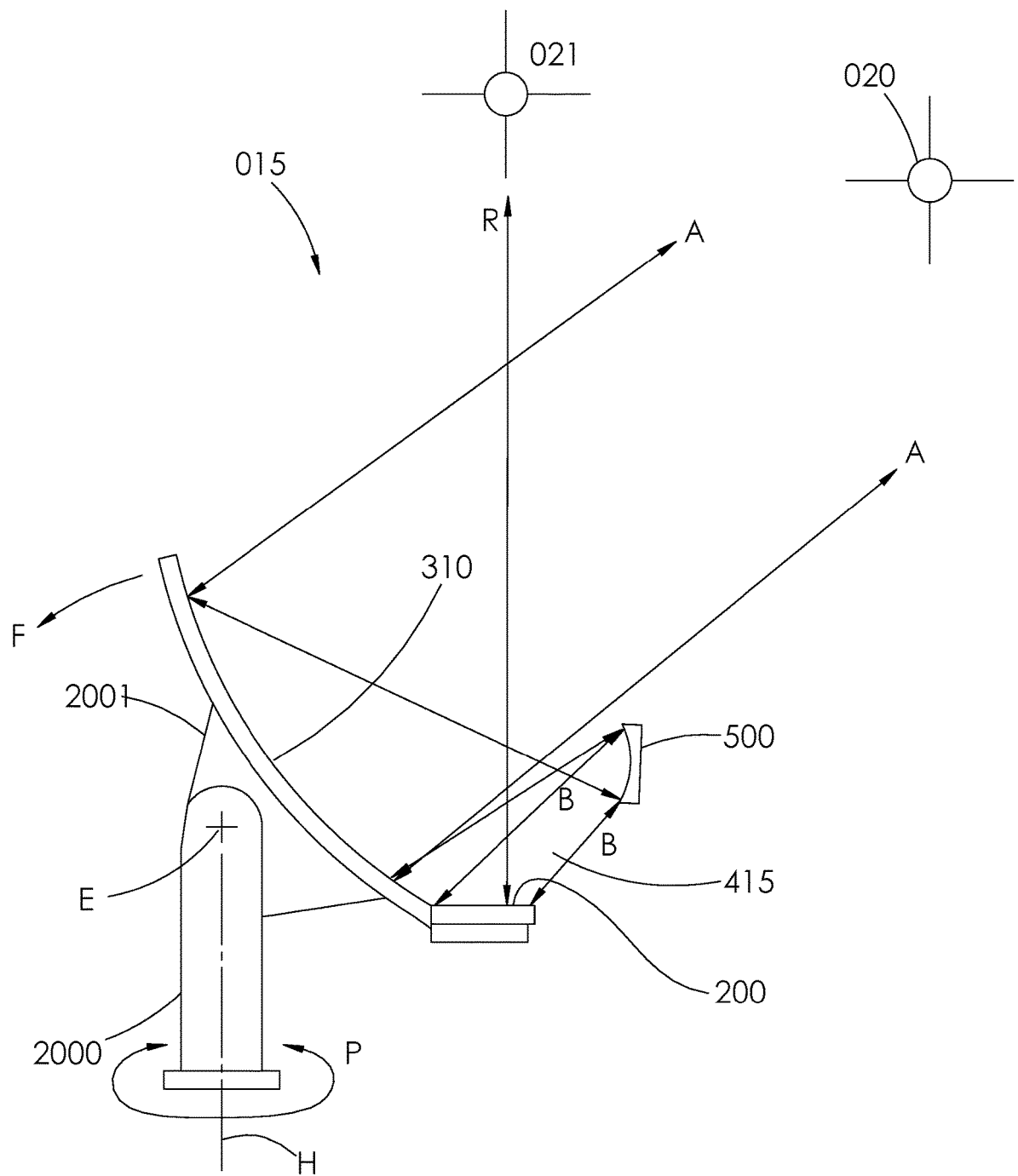
FIG. 6D depicts a side view of an embodiment of a bottom-fed offset Gregorian VSAT antenna system 015 of the invention, presented as an exemplary embodiment of the invention, and also presented as a non-limiting use case in which an ESA 200 feeds a concave subreflector of the Gregorian system in a first beam B, which beam is reflected into main reflector 320 by the subreflector, and in which main reflector reflects the first beam to a first satellite for communicating the first satellite; ESA 200 also simultaneously communicates with one or more second satellites, via one or more directed second beams R from ESA 200.

Referring now to FIGS. 6C and 6D, an embodiment of a communications terminal antenna system of the invention, which is a top-fed offset Cassegrain antenna configuration 014, comprising an ESA RF feed 200, is depicted (FIG. 6C) and a bottom-fed offset Gregorian VSAT antenna configuration 015, comprising an ESA RF feed 200, is depicted (FIG. 6D). In these exemplary embodiments, ESA 200 may be located outside main reflector 320. ESA 200 may direct a first RF beam B towards convex subreflector 400 (FIG. 6C) or concave subreflector 600 (FIG. 6D), which in turn reflects RF beam B in a direction A towards main reflector 320, which reflects the beam toward a first satellite 020 for communicating with first satellite 020. At the same time, ESA 200 may direct one or more second beams R towards one or more second satellite(s) 021 for tracking and communicating with second satellite(s) 021. Main reflector 320 may be pointed such that its beam A is directed to first satellite 020 by the azimuth and elevation rotation of pedestal 2000 about axes H and E, respectively, as depicted by arrows F and H. Pedestal 2000 may be attached to reflector by structure 2001. The one or more second beams R from ESA 200 may be independently continuously pointed at the one or more second satellites 021 by the independent steering of one or more second beams R using, for example, one or more ESA subarrays, as described above.

The system and method of the invention provide several advantages over the prior art. It is important to note that while some traditional ESAs may technically "operate" on, i.e. communicate with, multiple orbital satellites or satellite networks, they are inherently inefficient operating on (i.e. communicating with) GEO satellite networks, especially when the ESA performance is compared to parabolic-reflector terminals. The system and method of invention provides the operational efficiency/advantages (bandwidth and cost) of parabolic-reflector terminals operating on GEO orbital networks. Likewise, while traditional parabolic-reflector terminals can be made to operate On-The-Move or on LEO/MEO architectures, because such parabolic-reflector terminals acquire and track satellites via mechanical systems comprising motors and gears, they are heavy, expensive, and subject to failure, especially relative to ESA terminals. Additionally, two parabolic terminals are required to "make before break" (acquire the next satellite before losing connectivity with the current satellite in MEO/LEO). In contrast, the system and method of the invention require only one terminal for unbroken connectivity, i.e., "make before break" when transitioning communication as between two terminals is not required with the present invention. Also, in most instances in the prior art, a physical antenna feed change is required to enable a parabolic-reflector terminal to change bands. The system and method of the invention do not require a physical antenna feed change to enable the terminal to change frequency bands. The system and method of the invention provide the operational advantages and efficiencies of both parabolic reflector and ESA antennas. Thus, it is an advantage of the invention that, in embodiments, it comprises a parabolic reflector terminal that does not require a physical antenna feed change (i.e. swap-out) in order transition from operating on one frequency or frequency band to another frequency or frequency band.

Further, by combining parabolic and ESA antenna technologies as disclosed and claimed, the system and method of the invention provide at least three significant benefits over the individual parabolic antennas and ESA antennas of the prior art, used separately.

1. Footprint. The physical area available to install and deploy VSATs or MVSATs is often limited, especially on military vehicles. The integrated parabolic and ESA antenna of the invention utilizes a smaller footprint than two independent antennas of the prior art.

2. Physical Access. The subject invention comprising an integrated parabolic antenna and an ESA antenna can switch operation between multiple bands, multiple orbital satellites or satellite networks, and multiple use scenarios, without the need to physically access the VSAT or MVSAT to facilitate the switch, saving the warfighter time and minimizing their exposure to danger. This is distinct advantage or stand-alone parabolic antenna and ESA antenna of the prior art which require a user/operator to physically access the terminals to change frequency bands or satellites, or change operation between terminals or use scenarios.

3. Cost. The subject invention of an integrated parabolic and ESA terminal utilizes common parts that would otherwise be duplicated in an independent parabolic terminal and ESA terminal. Such parts include but are not limited to feeds, LNBs, BUCs, cabling, pedestals, mounts, etc.

In any of the embodiments, the communications terminal antenna system of the invention may be disposed within a radome comprising RF-transparent material.

In embodiments, the ESA may be operated independently of the main reflector in order to communicate with more than one satellites simultaneously, in any combination. For example, in such an embodiment, the ESA may be sending RF (i.e. EM energy) to a reflector(s) pointed at one (or more) satellites while simultaneously sending RF directly to a second (or more) satellite(s) allowing the VSAT or MVSAT to operate on two (or more) satellites simultaneously. This use case may be utilized, for instance, in configurations which the ESA aperture is pointed skyward such as the Cassegrain or Gregorian embodiments shown in the figures.

Referring to FIGS. 2A, 2B, 3A, 3B, 4A-4F, 5A, 5B and 6A-6D, the various embodiments of the of the invention may be mounted on, or attached to, any pedestal structure that is operable to place the communications terminal antenna system in an orientation so that the antenna system beam(s) is/are directed so as to be in communication with a desired satellite, in any orbital configuration. Such structure may take any shape or configuration dictated by a particular use case. In embodiments, the pedestal structure may comprise a pedestal 2000 that is controllable to rotate along arrow P about a pedestal longitudinal axis H (i.e., in an azimuth direction). Pedestal 2000 may also be rotatably attached to a structure 2001 that may be attached to a reflector support structure 301, enabling reflector support structure 301, and thus reflector 300, to be rotated in the direction of arrows F (i.e., in an elevation direction) about axis E. Thus the communications terminal antenna system may be oriented, through mechanical scanning or steering, or by manual pointing, or any combination thereof, such that either the main reflector beam or, in the case of the configuration of FIG. 2A in a DRA configuration, the ESA 200, in the relative direction of satellite(s) 020 in order to maximize ESA 200 gain in the direction of the satellite: and, the feed boom 600 may stow to present a lower VSAT physical profile. Any of the embodiments of the invention may be comprised of the pedestal structure to achieve any desired angular position of any of the communications terminal antenna system elements. In any embodiment of the invention, antenna pedestal pointing may be mechanically assisted or accomplished by any type of motor, servo motor, and/or gear apparatus, or may be achieved manually, i.e. by hand, or any combination of mechanically assisted and manual pointing. It is to be understood that the pedestal and structure elements depicted in the figures are for explanation only, and that these elements may take any shape, size or configuration as may be required for any particular use case.

In embodiments the various elements of the system and method of the invention may be present in any number, and in any combination. The embodiments described herein are intended to be exemplary, and not limiting, in nature as to the various combinations of the described elements comprising any specific embodiment of the system and method of the invention.

Referring again now to FIG. 6A, an exemplary use case of an embodiment of the VSAT of the invention 012 is described. The example shown in FIG. 6, and the description provided here, is also instructional as to the use of a method for determining the size of a main reflector of the invention, and to determine the gain required, and therefore the size of, an ESA 200 of the invention. The method presented here is applicable to make and use the various embodiments of the invention for various use cases. In the particular example depicted in FIG. 6A, the communications terminal, and the communications terminal antenna system of the invention, comprise a Cassegrain antenna configuration having a parabolic main reflector 320 and a convex subreflector 400, with an ESA 200 utilized as an offset RF feed for radiating a first beam B into subreflector 400, subreflector 400 being fed from the top in a "top-feed" configuration. Within the radiating surface of ESA 200, there are two independent ESA subarrays: a first ESA subarray having a first radiation pattern forming a first beam B for feeding the subreflector 400, which in turn reflects the first beam B towards the main reflector 320 which reflect the beam along the direction A towards a GEO satellite 020 in order to communicate with GEO satellite 020, which appears stationary to the VSAT; and a second ESA subarray having a second radiation pattern forming a second beam R for communicating directly with, and tracking, one or more moving LEO satellites 021 (i.e. in DRA fashion). A pedestal for steering the main reflector in a desired direction 2000 may provide such steering by a system of controllable servo motors or actuators, the pedestal being attached to the main reflector typically by an intermediate support structure 2001. The pedestal may be controllable to rotate around axis H in the direction of arrows P for azimuth angle steering, and the pedestal may rotate structure 2001 and therefore main reflector 320 in the direction of arrows F about axis C for elevation angle steering, in order to point the main beam A of main reflector 320 in a desired direction. In the example of FIG. 6A, the desired direction of beam A is towards GEO satellite 020.

First, the GEO satellite link is analyzed for both up and down link to ensure that sufficient SNR is available at the receivers for both the downlink (i.e., at the communications terminal as received from the GEO satellite transponder through the Cassegrain reflector and ESA RF first subarray), and the uplink (i.e., at the GEO satellite transponder, as received from the communications terminal as transmitted through the Cassegrain reflector fed by the ESA first subarray). Then, the LEO satellite link is analyzed for both uplink and downlink to ensure that sufficient SNR is available at the receivers for both the downlink (i.e., at the communications terminal as received directly from the LEO satellite transponder by the ESA RF second subarray), and the uplink (i.e., at the GEO satellite transponder, as received from the communications terminal as transmitted directly by the ESA second subarray). As regards communication with the LEO satellite in this example, the communications terminal ESA communicates as a DRA.

Still referring to the communications terminal use case of FIG. 6A, in a first step, the GEO->VSAT downlink SNR (satellite to VSAT) is calculated. The link equation for the GEO downlink is:

$$\text{SNR (dB)} = \text{Sat EIRP} - \text{Sat BW} - \text{FSPL} - \text{atm loss} + \text{VSAT } G/T - k \qquad \text{[EQN. 1]}$$

Where: "Sat EIRP" is the GEO satellite transponder EIRP (dBW);
"Sat BW" is GEO satellite transponder bandwidth (dBHz);
"FSPL" is free space path loss (dB);
"atm loss" is atmospheric loss at frequency (dB);
"G/T" is gain-to-noise temperature of communications terminal (dB/K); and
"k" is Boltzmann constant (−228.6 dBW/K/Hz).

The GEO satellite transponder EIRP is typically 48 dBW. The channel bandwidth of the GEO satellite transponder for a typical case may be assumed to be 36 MHz. Free space path loss (FSPL) can be calculated using the equation: FSPL=20 log(df)+92.45 (dB). For the downlink, the frequency is assumed at 12 GHz (Ku-band). The atmospheric absorption at Ku band is about 0.35 dB. The terminal G/T is assumed to be 12.7 dB/K.

Based on these exemplary numbers for the GEO downlink in this example, the SNR at the VSAT (or MVSAT) terminal is calculated to be 7.71 dB.

In a next step, the SNR for the communications terminal->GEO uplink is calculated. The link equation for the VSAT->GEO uplink is:

$$\text{SNR (dB)} = \text{VSAT EIRP} + G - \text{channel BW} - \text{FSPL} - \text{atm loss} + \text{Sat } G/T - k \qquad \text{[EQN. 2]}$$

Where: "VSAT EIRP" is communications terminal EIRP (dBW);
"G"=gain of VSAT antenna (dB);
"Channel BW" is transmitted bandwidth (dBHz);
"FSPL" is free space path loss (dB);
"atm loss" is atmospheric loss at frequency (dB);
"Sat G/T" is gain-to-noise temperature of the GEO satellite transponder, calculated as 12.7 dB/K; and
"k" is Boltzmann constant (−228.6 dBW/K/Hz).

The communications terminal radiated power is assumed to be 12 dBW. The VSAT antenna gain G is assumed to be 34 dBi. Therefore, the terminal EIRP is 46 dBW. Terminal channel BW is assumed to be 1 MHz. The GEO satellite G/T is assumed as typical at 4 dB/K. Free space path loss (FSPL) can be calculated using the equation: FSPL=20 log(df)+92.45 (dB). For the uplink, the frequency is 14.25 GHz.

Based on these exemplary numbers for the GEO->communications terminal uplink in this example, the SNR at the satellite transponder is calculated to be 11.13 dB. The Cassegrain main reflector size used in this exemplary link budget for VSAT to GEO, and vice versa, communication, based on a gain of 34 dBi, is estimated to be a diameter of 0.5 m.

Still referring to the communications terminal use case of FIG. 6A, in a next step, the LEO->communications terminal downlink SNR (satellite to VSAT) is now calculated. The link equation for the LEO downlink is:

$$\text{SNR (dB)} = \text{Sat EIRP} - \text{Sat BW} - \text{FSPL} - \text{atm loss} + G/T \text{ of terminal} - k \qquad \text{[EQN. 3]}$$

Where: "Sat EIRP" is the LEO satellite transponder EIRP (dBW);
"Sat BW" is LEO satellite transponder bandwidth (dBHz);
"FSPL" is free space path loss (dB);
"atm loss" is atmospheric loss at frequency (dB);
"G/T" is gain-to-noise temperature of communications terminal (dB/K); and
"k" is Boltzmann constant (−228.6 dBW/K/Hz).

For LEO satellites such as OneWeb, the FSPL is 175.62 dB at 12 GHz and 177.71 at 14.25 GHz. For this exemplary case the ESA second subarray is used to directly track and communicate with the LEO satellite without going through the Cassegrain reflector (i.e., in DRA fashion). The LEO satellite transponder EIRP is typically −13.9 dBW/4 kHz for OneWeb LEO satellites. The communications terminal G/T is assumed to be 23 (antenna gain)−21.3 (terminal noise temperature)=1.7 dB/K.

Based on these exemplary numbers for the LEO->communications terminal downlink in this example, the calculated SNR at the VSAT terminal is 4.41 dB.

In a next step, the SNR for the communications terminal->LEO uplink is calculated. The link equation for the VSAT->LEO uplink is:

$$\text{SNR (dB)} = \text{VSAT EIRP} + G - \text{channel BW} - \text{FSPL} - \text{atm loss} + \text{Sat } G/T - k \qquad \text{[EQN. 4]}$$

Where: "VSAT EIRP" is communications terminal EIRP (dBW);
"G"=gain of VSAT antenna (dB);
"Channel BW" is transmitted bandwidth (dBHz);
"FSPL" is free space path loss (dB);
"atm loss" is atmospheric loss at frequency (dB);
"Sat G/T" is gain-to-noise temperature of the LEO satellite transponder, calculated as 12.7 dB/K; and
"k" is Boltzmann constant (−228.6 dBW/K/Hz).

The communications terminal radiated power is assumed to be 2 dBW. The antenna gain G is assumed to be 23 dBi. Therefore, the VSAT EIRP is 25 dBW. The channel bandwidth of terminal transponder is assumed to be 1 MHz. Satellite G/T is −1 dB/K. For the communications terminal->LEO uplink of this example, the frequency is 14.5 GHz.

The calculated SNR for the communications terminal->LEO uplink of this example is 15.14 dB. The ESA second subarray size used in this link budget for communications terminal to LEO, and vice versa, communication, based on a gain of 23 dBi, is estimated to be 28 cm×28 cm.

Thus, still referring to the non-limiting exemplary embodiment and use case shown in FIG. 6A, the communications terminal is configured as a Cassegrain configuration, having an ESA feeding the sub reflector 400 with a first RF Ku-band beam B from a first ESA subarray, the subreflector reflecting the first RF beam from the first ESA subarray to the main reflector, which is approximately 0.5 m in diameter. The convex subreflector is approximately 11.5 cm in diameter. The main reflector reflects the first RF beam to a GEO satellite, communicating with the GEO satellite transponder with a SNR at the satellite transponder calculated to be 11.13 dB; and for GEO satellite to VSAT communication, a SNR at the VSAT (or MVSAT) terminal is calculated to be 7.71 dB. Thus, the inventive communications terminal is in communication with the GEO satellite. At the same time, in this example, the V communications terminal SAT ESA may be in direct communication with a second (LEO) satellite via the ESA second subarray having a surface area determined to be about 28 cm×28 cm or equivalent area (i.e., about 784 $cm^2$). The second ESA subarray emits a second RF Ku-band beam R directly to the LEO satellite. The uplink SNR at the second (LEO) satellite is calculated to be 15.14 dB at the LEO satellite transponder, and the second (LEO) satellite downlink SNR is calculated to be 4.41 dB at the communications terminal. The pedestal operates in azimuth and elevation to point the main reflector at the GEO satellite, while the ESA second subarray steers the second ESA beam to track and continue to communicate with the LEO satellite. In this use case, the LEO satellite data was used for link calculation was One Web LEO satellite information. This LEO satellite information is but one example of any LEO satellite (and, by extension, any MEO or other non-GEO satellite). The method disclosed herein may be used for any specific LEO, MEO or GEO satellite combination in order to size the communications terminal main reflector and ESA (and ESA second subarrays), for any desired antenna configuration, and for communication with one or more satellites of one or more orbital configurations, networks, constellations, or frequency bands, in any combination, simultaneously.

It is a feature of the invention that the use of an ESA, which may have multiple beams and may communicate with one or more satellites either directly (DRA) as described herein, or thorough a reflector, enables "make before break" operation, meaning that, when a system operator wishes to switch communication from first satellite to a different, second satellite, communications with the second satellite may be established before communication with the first satellite is terminated. This is not possible with many prior art systems with employing a separate communications terminal, especially when the first and second satellites are not in the same orbital configuration (such as LEO, MEO, GEO or non-GEO), or operating in the same frequency band. This functionality could be vitally important in the case in which satellites are lost, for example, due to hostile activity or on orbit failures.

It is a further feature of the invention that that the communications terminal and communications terminal antenna system of the invention enable the use of a single communications terminal and communications terminal antenna system for communicating with many satellites of different orbital configurations, and frequency bands. In other words, the communications terminal and communications terminal antenna system of the invention are agnostic as to orbital configurations, and frequency band. This feature of the invention reduces procurement costs, increases logistics and depot efficacy, reduces repair time, and results in greater "up-time" for the communications links, because the number of different terminal types required in order to meet operational scenarios is reduced.

It is a further feature of the invention that there communication system availability and reliability is increased because a greater number of satellites are made available for the system operator, due to the fact that the orbital configurations, communications terminal and communications terminal antenna system of the invention is able to communicate with a greater number of satellite terminals than communications terminals of the prior art.

The various embodiments of the communications terminal of the invention, and the inventive antenna system comprising the communications terminal, are intended for use in any communication system in which the communications terminal is in communication with a receiving system such a RF transponder of a satellite. Although the examples of the communications terminal system herein are primarily directed to satellite communications, this is only for convenience in describing the exemplary embodiments of the invention. It is within the intended scope of the invention that embodiments of the communications terminal, and the communications terminal antenna system, may be used for communication systems comprising only terrestrial segments, only airborne segments, only space segments or any combination of terrestrial, airborne or space segments. The communication terminal and antenna system configurations and elements described herein are usable and adaptable to any communication system, including but not limited to satellite communications. Such embodiments are within the intended scope of the invention. The communication terminal and antenna system of the invention, in embodiments, may therefore be defined as being any communications terminal whether or not it communicates with, or is intended to communicate with, satellite communication systems.

What is claimed is:

1. A communications terminal antenna system able to communicate with satellites in different orbital configurations without the need for replacing system feed components, comprising:
   a main reflector; and
   an electronically scanned array having a radiating surface radiating at least one beam for radiating at least one RF signal;
   wherein the electronically scanned array is attached to a rotatable, extendable feed arm, and wherein said rotatable, extendable feed arm is rotatably attached to a reflector support structure, said support structure supporting said main reflector;
   wherein the rotatable, extendable feed arm is operable to locate said electronically scanned array radiating surface at a focal point of said main reflector when said rotatable, extendable structure is extended into a first position; and
   wherein, in the first position, the electronically scanned array is oriented such that a first electronically scanned array beam covers said main reflector, and wherein said first electronically scanned array beam is reflected by said main reflector, creating a first radiating beam for communicating with a first earth-orbiting satellite; and
   wherein the rotatable, extendable feed arm is operable to locate said electronically scanned array radiating surface near a portion of the main reflector surface when said rotatable, extendable feed arm is contracted and rotated into a second position; and
   wherein, in the second position, the electronically scanned array is oriented such that it is able to communicate directly with a second earth-orbiting satellite.

2. The communications terminal antenna system of claim 1, in which the first earth-orbiting satellite and second earth-orbiting satellite are the same satellite.

3. The communications terminal antenna system of claim 1, in which the electronically scanned array at least one beam is further defined as two or more beams, each of the two or more beams able to be independently directed towards different earth-orbiting satellites when the VSAT system is configured in the second position.

4. The communications terminal antenna system of claim 1, wherein said first earth-orbiting satellite is in a first orbital configuration, and said second earth-orbiting satellite is in a second orbital configuration.

5. The communications terminal antenna system of claim 1, wherein said radiating surface of electronically scanned array is able to be extended by the addition of ESA extension panels.

6. The communications terminal antenna system of claim 1, wherein said main reflector is supported by a tracking antenna pedestal, the tracking antenna pedestal operable to rotate the parabolic reflector in azimuth and elevation directions such that the main reflector is able to track satellites in LEO and MEO, and to point to satellites in GEO.

7. The communications terminal antenna system of claim 1, in which the reflective surface of the main reflector is parabolic in shape.

8. The communications terminal antenna system of claim 1, in which the communications terminal antenna system is adapted to comprise a portion of an MVSAT.

9. The communications terminal antenna system of claim 1, wherein said first radiating beam comprises X, Ka or Ku band RF energy, and wherein said second radiating beam comprises X, Ka or Ku band RF energy.

10. A communications terminal antenna system able to communicate with satellites in different orbital configurations without the need for replacing system feed components, comprising:
   a main reflector and a subreflector; and
   an electronically scanned array having a radiating surface radiating at least one beam, said electronically scanned array radiating a first beam of said at least one beam towards said subreflector;
   wherein the subreflector is attached to a subreflector support structure, said subreflector support structure attached to a main reflector support structure;
   wherein said subreflector support structure is operable to place said subreflector at a focal point of the main reflector;
   and wherein said subreflector is oriented such that the said first beam from the electronically scanned array is directed towards the subreflector, and the subreflector reflects said first beam towards the main reflector, and the main reflector reflects said first beam towards a first earth-orbiting satellite, for communicating with the first earth-orbiting satellite.

11. The communications terminal antenna system of claim 10, wherein the main reflector is parabolic in shape.

12. The communications terminal antenna system of claim 10, wherein said at least one electronically scanned array beam further comprises at least one second beam directed from the electronically scanned array directly towards a second earth-orbiting satellite.

13. The communications terminal antenna system of claim 12, wherein said first earth-orbiting satellite is in a first orbital configuration, and said second earth-orbiting satellite is in a second orbital configuration.

14. The communications terminal antenna system of claim 12, wherein said first earth-orbiting satellite and said second earth-orbiting satellite are the same satellite.

15. The communications terminal antenna system of claim 10, wherein the subreflector comprises a convex surface and the reflector system is a Cassegrain system.

16. The communications terminal antenna system of claim 10, wherein the subreflector comprises a concave surface and the reflector system is a Gregorian system.

17. The communications terminal antenna system of claim 10, wherein the VSAT system is adapted to be mounted onto a vehicle, marine vessel, aircraft, or trailer, establishing a Mobile VSAT, or MVSAT.

18. The communications terminal antenna system of claim 10, wherein said first beam comprises X, Ka or Ku band RF energy.

19. The communications terminal antenna system of claim 10, wherein the main reflector is parabolic in shape, and wherein the reflector system is an offset parabolic system.

20. The communications terminal antenna system of claim 12, wherein said second beam comprises X, Ka or Ku band RF energy.

21. The communications terminal antenna system of claim 10, wherein the first and second beams are in differing RF frequency bands.

22. A communications terminal antenna system able to communicate with satellites in different orbital configurations without the need for replacing VSAT system feed components, comprising:
   a main reflector; and
   an electronically scanned array, said electronically scanned array having a beam directed towards said main reflector;
   wherein the electronically scanned array is attached to an electronically scanned array support structure, said electronically scanned array support structure attached to a main reflector support structure;
   wherein said electronically scanned array support structure is operable to place said electronically scanned array at a focal point of the main reflector;
   and wherein said electronically scanned array is oriented such that the beam from the electronically scanned array is directed towards the main reflector, and the main reflector reflects the radiating beam towards an earth-orbiting satellite, for communicating with the earth-orbiting satellite.

23. The communications terminal antenna system of claim 22, wherein the main reflector is parabolic in shape, and wherein the reflector system is an offset parabolic system.

24. The communications terminal antenna system of claim 22, in which the VSAT system is adapted to be mounted onto a vehicle, marine vessel, aircraft, or trailer, establishing a Mobile VSAT.

25. The communications terminal antenna system of claim 22, wherein said radiating beam comprises X, Ka or Ku band RF energy.

26. A communications terminal antenna system able to communicate with satellites in different orbital configurations without the need for replacing antenna system feed components, comprising:
   a main reflector, a subreflector and a tertiary reflector; and
   an electronically scanned array having a radiating surface radiating a beam towards said tertiary reflector;
   wherein the tertiary reflector reflects the beam through an opening in the main reflector and towards said subreflector;
   wherein the subreflector is attached to a subreflector support structure, said subreflector support structure attached to a main reflector support structure;
   wherein said subreflector support structure is operable to place said subreflector at a focal point of the main reflector;
   and wherein said subreflector is oriented such that the reflected beam from the tertiary reflector is reflected by the subreflector towards the main reflector, and the main reflector reflects said beam towards an earth-orbiting satellite, for communicating with the earth-orbiting satellite.

27. The communications terminal antenna system of claim 26, wherein the main reflector is parabolic in shape.

28. The communications terminal antenna system of claim 26, in which the VSAT system is adapted to be mounted onto a vehicle, marine vessel, aircraft, or trailer, establishing a Mobile VSAT, or MVSAT.

29. The communications terminal antenna system of claim 26, wherein said radiating beam comprises X, Ka or Ku band RF energy.

30. The communications terminal antenna system of claim 26, wherein said main reflector is supported by a tracking antenna pedestal, the tracking antenna operable to rotate the parabolic reflector in azimuth and elevation directions such that the main reflector is able to track satellites in LEO, MEO, or other non-GEO configurations, and to point to satellites in GEO.

31. A communications terminal antenna system for communicating with one or more receiving systems, without the need to replace feed components, comprising:

a main reflector, a subreflector and an ESA having a radiating surface, wherein:

the ESA configured to radiate a first RF beam and a second RF beam from said ESA radiating surface;

the ESA radiating surface is oriented to radiate the first beam toward said subreflector wherein the subreflector is located and oriented so as to reflect the first beam toward the main reflector, and the main reflector is located and oriented so as to reflect the first beam in a first intended direction towards a first antenna of a first communication system; and wherein the ESA radiating surface is also oriented to directly radiate the second beam in a second intended direction towards a second antenna of a second communication system.

32. The communications terminal antenna system of claim 31 in which the first communication system is further defined as a first earth-orbiting satellite, and the second communication system is further defined as a second earth-orbiting satellite.

33. The communications terminal antenna system of claim 32 in which the first earth-orbiting satellite and the second earth-orbiting satellite are in different orbital configurations.

34. The communications terminal antenna system of claim 31, wherein a first frequency band of operation of the first communication system is selected from the group consisting of X-band, Ku-band, and Ka-band; and wherein a second frequency band of operation of the first communication system is selected from the group consisting of X-band, Ku-band, and Ka-band; wherein the first frequency band and the second frequency band are not the same frequency band.

35. The communications terminal antenna system of claim 31 in which the first direction and second direction are independently steerable.

36. The communications terminal antenna system of claim 31 in which the first direction is at least partially determined by mechanically steering the main reflector, and in which the second direction is at least partially determined by electronically steering the ESA second beam.

37. The communications terminal antenna system of claim 31, wherein the communications terminal antenna system is adapted to be mounted onto a vehicle, marine vessel, aircraft, or trailer.

* * * * *